United States Patent
Schmitz et al.

(10) Patent No.: US 9,290,854 B2
(45) Date of Patent: Mar. 22, 2016

(54) COUNTERFEITING DETERRENT AND SECURITY DEVICES, SYSTEMS AND METHODS

(71) Applicant: MICROFABRICA INC., Van Nuys, CA (US)

(72) Inventors: Gregory P. Schmitz, Los Gatos, CA (US); Michael S. Lockard, Lake Elizabeth, CA (US); Ming-Ting Wu, Northridge, CA (US); Eric C. Miller, Los Gatos, CA (US); Adam L. Cohen, Los Angeles, CA (US)

(73) Assignee: Microfabrica Inc., Van Nuys, CA (US)

( * ) Notice: Subject to any disclaimer, the term of this patent is extended or adjusted under 35 U.S.C. 154(b) by 0 days.

(21) Appl. No.: 14/333,458

(22) Filed: Jul. 16, 2014

(65) Prior Publication Data

US 2015/0021190 A1 Jan. 22, 2015

Related U.S. Application Data

(60) Provisional application No. 61/846,865, filed on Jul. 16, 2013.

(51) Int. Cl.
*G06F 19/00* (2011.01)
*C25D 1/00* (2006.01)

(52) U.S. Cl.
CPC ..................... *C25D 1/003* (2013.01)

(58) Field of Classification Search
CPC .... G07F 19/20; G06Q 20/1085; B42D 15/10; G06K 19/007; G06K 19/06037; G06K 7/14
USPC .......................................... 235/379, 488, 494
IPC ....... G07F 19/20; G06Q 20/1085; B42D 15/10; G06K 19/007, 19/06037, 7/14
See application file for complete search history.

(56) References Cited

U.S. PATENT DOCUMENTS 2,259,015 A 10/1941 Anderson et al.
2,455,655 A 12/1948 Carroll
(Continued)

FOREIGN PATENT DOCUMENTS

EP 0925857 A2 6/1999
EP 1256319 A2 11/2002
(Continued)

OTHER PUBLICATIONS

Schmitz et al.; U.S. Appl. No. 14/452,376 entitled Selective removal tool for use in medical applications and method for making and using, filed Aug. 5, 2014.
(Continued)

*Primary Examiner* — Karl D Frech
(74) *Attorney, Agent, or Firm* — Shay Glenn LLP

(57) ABSTRACT

A counterfeiting deterrent device according to one implementation of the disclosure includes a plurality of layers formed by an additive process. Each of the layers may have a thickness of less than 100 microns. At least one of the layers has a series of indentations formed in an outer edge of the layer such that the indentations can be observed to verify that the device originated from a predetermined source. According to another implementation, a counterfeiting deterrent device includes at least one raised layer having outer edges in the shape of a logo. A light source is configured and arranged to shine a light through a slit in a substrate layer of the device and past an intermediate layer to light up the outer edge of the raised layer. The layers of the device are formed by an additive process and have a thickness of less than 100 microns each.

20 Claims, 26 Drawing Sheets

(56) References Cited

U.S. PATENT DOCUMENTS

| | | |
|---|---|---|
| 3,404,677 A | 10/1968 | Springer |
| 3,882,872 A | 5/1975 | Douvas et al. |
| 3,937,222 A | 2/1976 | Banko |
| 4,334,650 A | 6/1982 | Hardwick et al. |
| 4,598,710 A | 7/1986 | Kleinberg et al. |
| 4,621,637 A | 11/1986 | Fishbein |
| 4,747,821 A | 5/1988 | Kensey et al. |
| 4,804,364 A | 2/1989 | Dieras et al. |
| 4,842,578 A | 6/1989 | Johnson et al. |
| 4,844,363 A | 7/1989 | Garnier et al. |
| 4,854,808 A | 8/1989 | Bisiach |
| 4,943,296 A | 7/1990 | Funakubo et al. |
| 4,983,179 A | 1/1991 | Sjostrom |
| 4,986,807 A | 1/1991 | Farr |
| 5,019,088 A | 5/1991 | Farr |
| 5,084,052 A | 1/1992 | Jacobs |
| 5,141,168 A | 8/1992 | Pepper |
| 5,160,095 A | 11/1992 | Pepper |
| 5,181,433 A | 1/1993 | Ueno et al. |
| 5,190,637 A | 3/1993 | Guckel |
| 5,226,909 A | 7/1993 | Evans et al. |
| 5,284,486 A | 2/1994 | Kotula et al. |
| 5,378,583 A | 1/1995 | Guckel et al. |
| 5,411,511 A | 5/1995 | Hall |
| 5,465,444 A | 11/1995 | Bigler et al. |
| 5,484,112 A | 1/1996 | Koenig |
| 5,496,668 A | 3/1996 | Guckel et al. |
| 5,522,829 A | 6/1996 | Michalos |
| 5,549,637 A | 8/1996 | Crainich |
| 5,575,799 A | 11/1996 | Bolanos et al. |
| 5,576,147 A | 11/1996 | Guckel et al. |
| 5,591,187 A | 1/1997 | Dekel |
| 5,601,556 A | 2/1997 | Pisharodi |
| 5,618,293 A | 4/1997 | Sample et al. |
| 5,643,304 A | 7/1997 | Schechter et al. |
| 5,662,284 A | 9/1997 | Koenig |
| 5,676,321 A | 10/1997 | Kroger |
| 5,685,838 A | 11/1997 | Peters et al. |
| 5,695,510 A | 12/1997 | Hood |
| 5,718,618 A | 2/1998 | Guckel et al. |
| 5,725,530 A | 3/1998 | Popken |
| 5,779,713 A | 7/1998 | Turjanski et al. |
| 5,782,848 A | 7/1998 | Lennox |
| 5,788,169 A | 8/1998 | Koenig |
| 5,823,990 A | 10/1998 | Henley |
| 5,846,244 A | 12/1998 | Cripe |
| 5,866,281 A | 2/1999 | Guckel et al. |
| 5,908,719 A | 6/1999 | Guckel et al. |
| 5,910,150 A | 6/1999 | Saadat |
| 5,916,231 A | 6/1999 | Bays |
| 5,928,158 A | 7/1999 | Aristides |
| 5,928,161 A | 7/1999 | Krulevitch et al. |
| 5,957,881 A | 9/1999 | Peters et al. |
| 6,001,112 A | 12/1999 | Taylor |
| 6,010,477 A | 1/2000 | Bays |
| 6,013,991 A | 1/2000 | Philipp |
| 6,027,630 A | 2/2000 | Cohen |
| 6,063,088 A | 5/2000 | Winslow |
| 6,221,088 B1 | 4/2001 | Bays |
| 6,238,405 B1 | 5/2001 | Findlay et al. |
| 6,293,957 B1 | 9/2001 | Peters et al. |
| 6,447,525 B2 | 9/2002 | Follmer et al. |
| 6,454,717 B1 | 9/2002 | Pantages et al. |
| 6,475,369 B1 | 11/2002 | Cohen |
| 6,503,263 B2 | 1/2003 | Adams |
| 6,517,544 B1 | 2/2003 | Michelson |
| 6,565,588 B1 | 5/2003 | Clement et al. |
| 6,572,613 B1 | 6/2003 | Ellman et al. |
| 6,572,742 B1 | 6/2003 | Cohen |
| 6,613,972 B2 | 9/2003 | Cohen et al. |
| 6,663,031 B2 | 12/2003 | Henderson et al. |
| 6,666,874 B2 | 12/2003 | Heitzmann et al. |
| 6,753,952 B1 | 6/2004 | Lawrence et al. |
| 6,761,723 B2 | 7/2004 | Buttermann et al. |
| 6,790,377 B1 | 9/2004 | Cohen |
| 6,951,456 B2 | 10/2005 | Cohen et al. |
| 7,160,304 B2 | 1/2007 | Michelson |
| 7,163,614 B2 | 1/2007 | Cohen |
| 7,195,989 B2 | 3/2007 | Lockard et al. |
| 7,229,544 B2 | 6/2007 | Cohen |
| 7,235,088 B2 | 6/2007 | Pintor et al. |
| 7,239,219 B2 | 7/2007 | Brown et al. |
| 7,252,861 B2 | 8/2007 | Smalley |
| 7,479,147 B2 | 1/2009 | Honeycutt et al. |
| 7,540,867 B2 | 6/2009 | Jinno et al. |
| 7,699,790 B2 | 4/2010 | Simpson |
| 8,002,776 B2 | 8/2011 | Liu et al. |
| 8,034,003 B2 | 10/2011 | Pesce et al. |
| 8,292,889 B2 | 10/2012 | Cunningham et al. |
| 8,414,607 B1 | 4/2013 | Lockard et al. |
| 8,475,458 B2 | 7/2013 | Lockard et al. |
| 8,475,483 B2 | 7/2013 | Schmitz et al. |
| 8,512,342 B2 | 8/2013 | Meredith |
| 8,534,708 B2 * | 9/2013 | Heim et al. ............... 283/72 |
| 8,795,278 B2 | 8/2014 | Schmitz et al. |
| 2001/0041307 A1 | 11/2001 | Lee et al. |
| 2002/0138088 A1 | 9/2002 | Nash et al. |
| 2003/0179364 A1 | 9/2003 | Steenblik et al. |
| 2004/0138672 A1 | 7/2004 | Michelson |
| 2005/0021065 A1 | 1/2005 | Yamada et al. |
| 2005/0029109 A1 | 2/2005 | Zhang et al. |
| 2005/0054972 A1 | 3/2005 | Adams et al. |
| 2005/0059905 A1 | 3/2005 | Boock et al. |
| 2005/0222598 A1 | 10/2005 | Ho et al. |
| 2006/0089662 A1 | 4/2006 | Davison et al. |
| 2006/0161185 A1 | 7/2006 | Saadat et al. |
| 2006/0184175 A1 | 8/2006 | Schomer et al. |
| 2006/0200152 A1 | 9/2006 | Karubian et al. |
| 2006/0212060 A1 | 9/2006 | Hacker et al. |
| 2006/0217730 A1 | 9/2006 | Termanini |
| 2006/0229624 A1 | 10/2006 | May et al. |
| 2006/0229646 A1 | 10/2006 | Sparks |
| 2006/0241566 A1 | 10/2006 | Moon et al. |
| 2006/0282065 A1 | 12/2006 | Cohen |
| 2007/0073303 A1 | 3/2007 | Namba |
| 2007/0100361 A1 | 5/2007 | Cohen |
| 2007/0197895 A1 | 8/2007 | Nycz et al. |
| 2007/0198038 A1 | 8/2007 | Cohen et al. |
| 2007/0219459 A1 | 9/2007 | Cohen |
| 2007/0260253 A1 | 11/2007 | Johnson et al. |
| 2007/0265648 A1 | 11/2007 | Cohen |
| 2008/0004643 A1 | 1/2008 | To et al. |
| 2008/0009697 A1 | 1/2008 | Haider et al. |
| 2008/0065125 A1 | 3/2008 | Olson |
| 2008/0091224 A1 | 4/2008 | Griffis et al. |
| 2008/0161809 A1 | 7/2008 | Schmitz et al. |
| 2008/0249553 A1 | 10/2008 | Gruber et al. |
| 2009/0012524 A1 | 1/2009 | Dower |
| 2009/0018565 A1 | 1/2009 | To et al. |
| 2009/0018566 A1 | 1/2009 | Escudero et al. |
| 2009/0124975 A1 | 5/2009 | Oliver et al. |
| 2009/0218401 A1 * | 9/2009 | Moran et al. ............... 235/439 |
| 2009/0228030 A1 | 9/2009 | Shadeck |
| 2009/0234378 A1 | 9/2009 | Escudero et al. |
| 2009/0270812 A1 | 10/2009 | Litscher et al. |
| 2009/0306773 A1 | 12/2009 | Silvestrini et al. |
| 2010/0010525 A1 | 1/2010 | Lockard et al. |
| 2010/0094320 A1 | 4/2010 | Arat et al. |
| 2010/0152758 A1 | 6/2010 | Mark et al. |
| 2010/0160916 A1 | 6/2010 | Chana et al. |
| 2010/0191266 A1 | 7/2010 | Oliver et al. |
| 2010/0217268 A1 | 8/2010 | Bloebaum et al. |
| 2011/0112563 A1 | 5/2011 | To et al. |
| 2011/0190738 A1 | 8/2011 | Zemlok et al. |
| 2011/0226861 A1 * | 9/2011 | Warther ............... 235/492 |
| 2011/0230727 A1 | 9/2011 | Sanders et al. |
| 2011/0288573 A1 | 11/2011 | Yates et al. |
| 2012/0041263 A1 | 2/2012 | Sholev |
| 2012/0071752 A1 | 3/2012 | Sewell et al. |
| 2012/0109024 A1 | 5/2012 | Theuer |
| 2012/0125993 A1 * | 5/2012 | Thiele et al. ............... 235/375 |
| 2012/0191116 A1 | 7/2012 | Fylnn et al. |
| 2012/0191121 A1 | 7/2012 | Chen et al. |
| 2012/0221035 A1 | 8/2012 | Harvey |

(56) References Cited

U.S. PATENT DOCUMENTS

| | | |
|---|---|---|
| 2012/0234927 A1* | 9/2012 | Poidomani et al. ........... 235/492 |
| 2013/0012975 A1 | 1/2013 | Schmitz et al. |
| 2013/0226209 A1 | 8/2013 | Lockard et al. |
| 2014/0100558 A1 | 4/2014 | Schmitz et al. |
| 2014/0114336 A1 | 4/2014 | Schmitz et al. |
| 2014/0148729 A1 | 5/2014 | Schmitz et al. |
| 2014/0148835 A1 | 5/2014 | Schmitz et al. |
| 2014/0148836 A1 | 5/2014 | Schmitz et al. |
| 2014/0163596 A1 | 6/2014 | Chen et al. |
| 2015/0173788 A1 | 6/2015 | Lockard et al. |

FOREIGN PATENT DOCUMENTS

| | | |
|---|---|---|
| EP | 1026996 B1 | 10/2007 |
| WO | WO93/05719 A1 | 4/1993 |
| WO | WO99/63891 A1 | 12/1999 |
| WO | WO02/49518 A2 | 6/2002 |
| WO | WO02/062226 A1 | 8/2002 |
| WO | WO 2008/037984 A2 | 4/2008 |
| WO | WO 2012/040432 A1 | 3/2012 |

OTHER PUBLICATIONS

Cohen et al.; EFAB: Batch production of functional, fully-dense metal parts with micron-scale features; Proc 9th, Solid Freeform Fabrication; Univ. of Texas at Austin; pp. 161-168; Aug. 1998.

Cohen et al.; EFAB: low-cost automated electrochemical batch fabrication of abritrary 3-D microstructures; Micromachining and Microfabrication Process Technology, SPIE 1999 Symposium on Micromachining and Microfabrication; 11 pgs.; Sep. 1999.

Cohen et al.; EFAB: Rapid, low-cost desktop micromachining of high aspect ratio true 3-D MEMS; Proc. 12th, IEEE Micro Electro Mechanical Systems Workshop; IEEE; pp. 244-251; Jan. 1999.

Cohen, Adam L.; 3-D micromachining by electrochemical fabrication; Micromachine Devices; pp. 6-7; Mar. 1999.

Cohen, Adam L.; Electrochemical Fabrication (EFAB}); MEMS Handbook; Chapter 19; CRC Press LLC; pp. 19-1-19-23; Jan. 7, 2002.

Microfabrication—rapid prototyping's killer application; Rapid Prototyping Report; vol. 9; No. 6; pp. 1-5; Jun. 1999.

SSI Shredding Systems; www.ssiworld.com; 16 pgs.; Sep. 24, 2009 (downloaded).

Tseng et al.; EFAB: high aspect ratio, arbitrary 3-D metal microstructures using a low -cost automated batch process; 3rd Int'l. Workshop on High Aspect Ratio Microstructure Technology (HARMST99); Kazusa, Japan; 4 pgs.; Jun. 1999.

Tseng et al.; EFAB: high aspect ratio, arbitrary 3-D metal microstructures using a low-cost automated batch process; Microelectromechanical Systems (MEMS); vol. 1; ASME 1999 (Int'l. Mechanical Engineering Congress and Exposition; 6 pgs.; Nov. 1999.

Zhang et al.; EFAB: rapid desktop manufacturing of true 3-D microstructures; Proc. 2nd Int'l. Conf. on Integrated MicroNanotechnology for Space Applications; The Aerospace Co.; 11 pgs.; Apr. 1999.

Schmitz et al.; U.S. Appl. No. 14/440,088 entitled "Micro-mechanical device and method for obstructive sleep apnea treatment," filed May 1, 2015.

Jho et al.; Endoscopy assisted transsphenoidal surgery for pituitary adenoma; Acta Neurochirurgica; 138(12); pp. 1416-1425; 1996 (year of pub. sufficiently earlier than effective US filing date and any foreign priority date).

* cited by examiner

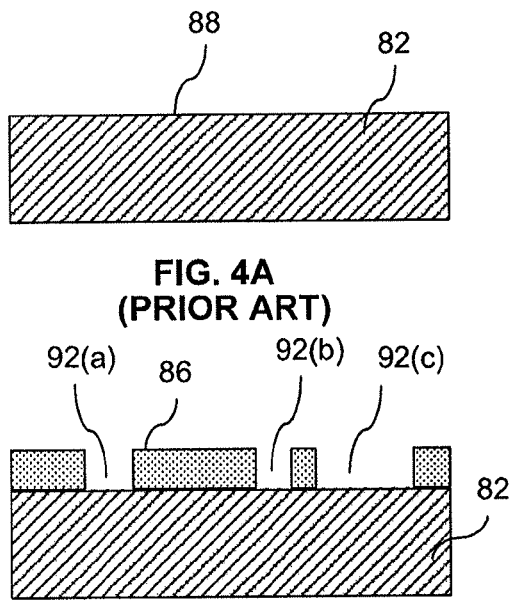
FIG. 4A
(PRIOR ART)
FIG. 4B
(PRIOR ART)
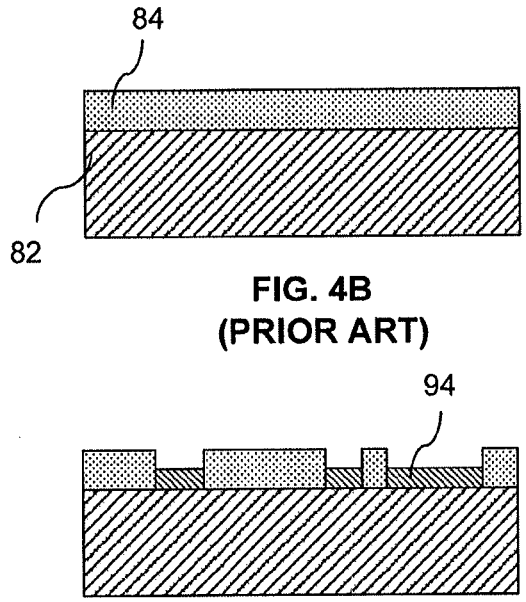
FIG. 4C
(PRIOR ART)
FIG. 4D
(PRIOR ART)
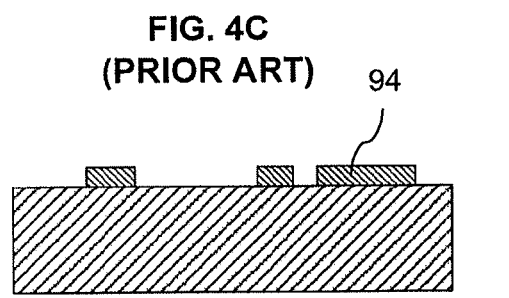
FIG. 4E
(PRIOR ART)
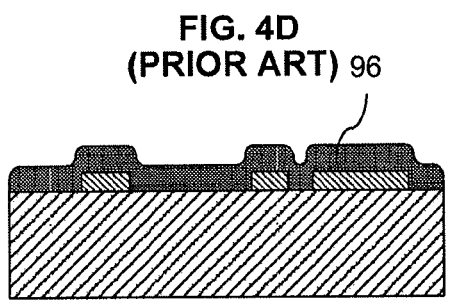
FIG. 4F
(PRIOR ART)
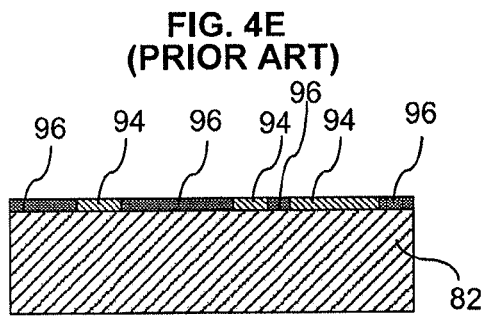
FIG. 4G
(PRIOR ART)
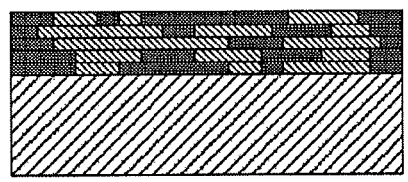
FIG. 4H
(PRIOR ART)
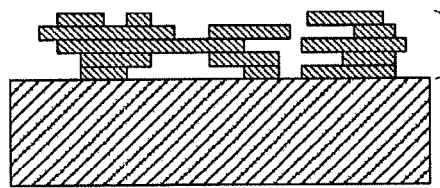
FIG. 4I
(PRIOR ART)

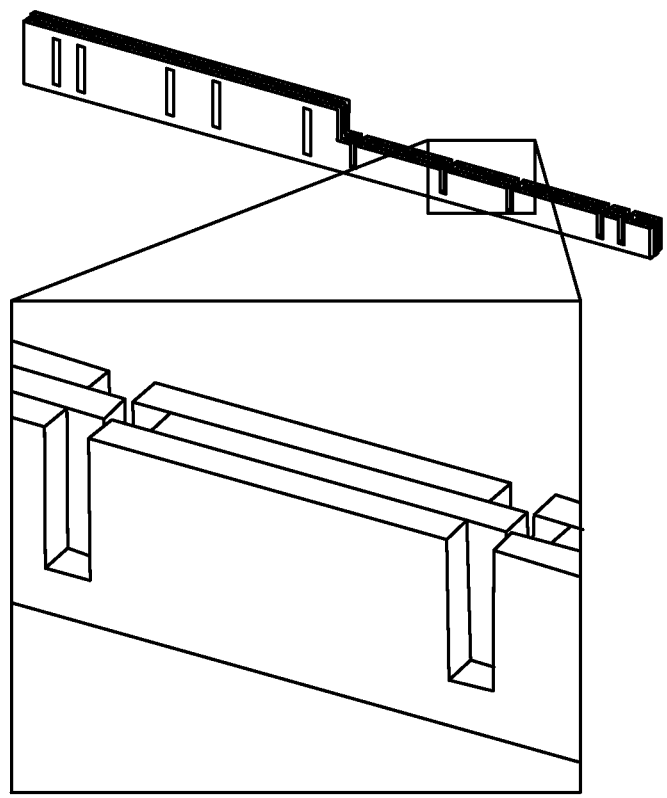
FIG. 20
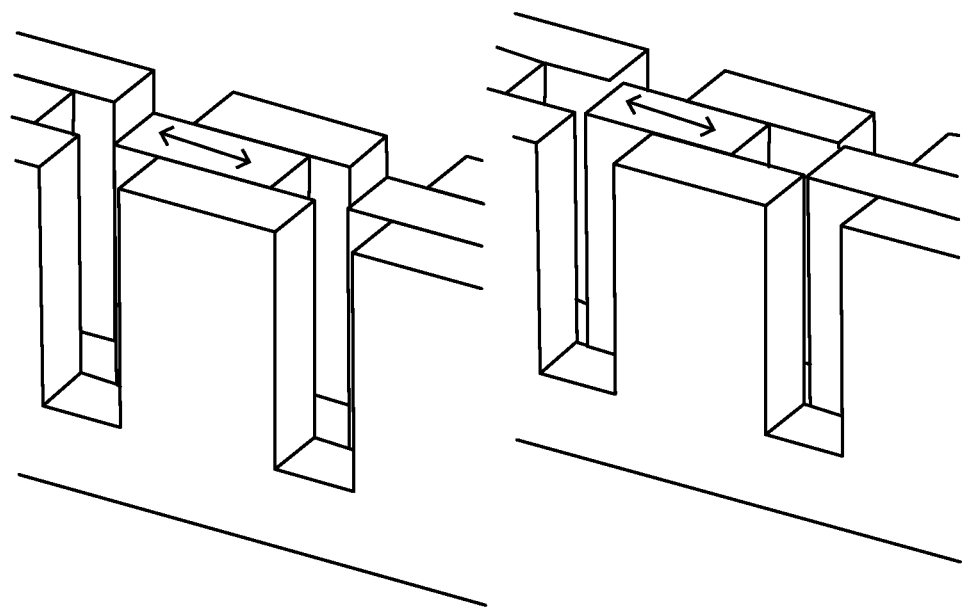
FIG. 21A  FIG. 21B

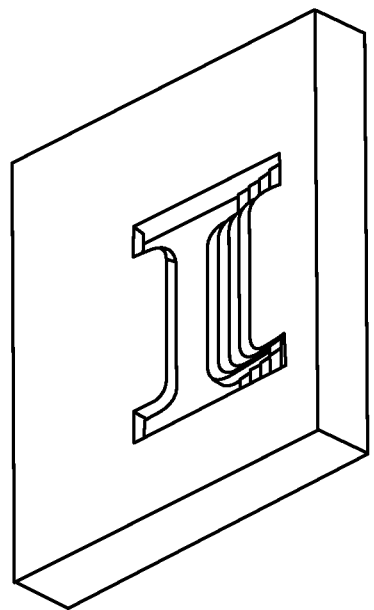
FIG. 24
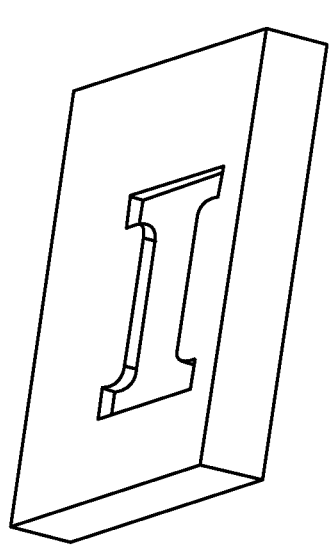 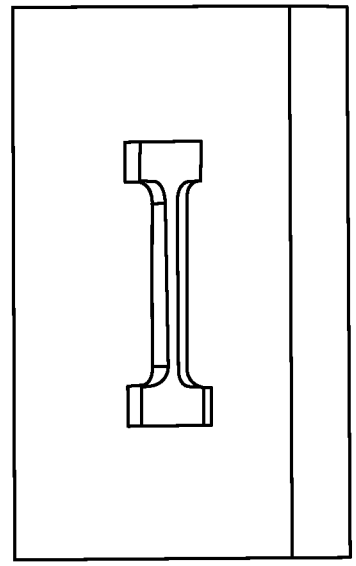
FIG. 25      FIG. 26

COUNTERFEITING DETERRENT AND SECURITY DEVICES, SYSTEMS AND METHODS

CROSS REFERENCE TO RELATED APPLICATIONS

This application claims the benefit of U.S. Provisional Application No. 61/846,865, filed Jul. 16, 2013 which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

STATEMENT AS TO FEDERALLY SPONSORED RESEARCH

None.

FIELD

The present disclosure relates generally to the field of electrochemically fabricating multi-layer three dimensional structures, and more specifically to devices formed by such processes for use as anti-counterfeiting elements in commercial devices such as for example watches, jewelry, original art work, limited edition art work, or other items subject to counterfeiting.

BACKGROUND

Electrochemical Fabrication:

An electrochemical fabrication technique for forming three-dimensional structures from a plurality of adhered layers is being commercially pursued by Microfabrica® Inc. (formerly MEMGen Corporation) of Van Nuys, Calif. under the name EFAB®.

Various electrochemical fabrication techniques are described in U.S. Pat. No. 6,027,630, issued on Feb. 22, 2000 to Adam Cohen. Some embodiments of this electrochemical fabrication technique allow for the selective deposition of a material using a mask that includes a patterned conformable material on a support structure that is independent of the substrate onto which plating will occur. When desiring to perform an electrodeposition using the mask, the conformable portion of the mask is brought into contact with a substrate, but not adhered or bonded to the substrate, while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica Inc. such masks have come to be known as INSTANT MASKS™ and the process known as INSTANT MASKING™ or INSTANT MASK™ plating. Selective depositions using conformable contact mask plating may be used to form single selective deposits of material or may be used in a process to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p 161, August 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p 244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated MicroNanotechnology for Space Applications, The Aerospace Co., April 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST'99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFAB™)", Chapter 19 of The MEMS Handbook, edited by Mohamed Gad-El-Hak, CRC Press, 2002.

(9) Microfabrication—Rapid Prototyping's Killer Application", pages 1-5 of the Rapid Prototyping Report, CAD/CAM Publishing, Inc., June 1999.

The disclosures of these nine publications are hereby incorporated herein by reference as if set forth in full herein.

An electrochemical deposition for forming multilayer structures may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate. Typically this material is either a structural material or a sacrificial material.

2. Then, blanket depositing at least one additional material by electrodeposition so that the additional deposit covers both the regions that were previously selectively deposited onto, and the regions of the substrate that did not receive any previously applied selective depositions. Typically this material is the other of a structural material or a sacrificial material.

3. Finally, planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to an immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed. The removed material is a sacrificial material while the material that forms part of the desired structure is a structural material.

The preferred method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated (the pattern of conformable material is complementary to the pattern of material to be deposited). At least one CC mask is used for each unique cross-sectional pattern that is to be plated.

The support for a CC mask is typically a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for multiple CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In preparation for performing the selective deposition of the first operation, the conformable portion of the CC mask is placed in registration with and pressed against a selected portion of (1) the substrate, (2) a previously formed layer, or (3) a previously deposited portion of a layer on which deposition is to occur. The pressing together of the CC mask and relevant substrate occur in such a way that all openings, in the conformable portions of the CC mask contain plating solution. The conformable material of the CC mask that contacts the substrate acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 1A-1C. FIG. 1A shows a side view of a CC mask 8 consisting of a conformable or deformable (e.g. elastomeric) insulator 10 patterned on an anode 12. The anode has two functions. One is as a supporting material for the patterned insulator 10 to maintain its integrity and alignment since the pattern may be topologically complex (e.g., involving isolated "islands" of insulator material). The other function is as an anode for the electroplating operation. FIG. 1A also depicts a substrate 6, separated from mask 8, onto which material will be deposited during the process of forming a layer. CC mask plating selectively deposits material 22 onto substrate 6 by simply pressing the insulator against the substrate then electrodepositing material through apertures 26a and 26b in the insulator as shown in FIG. 1B. After deposition, the CC mask is separated, preferably non-destructively, from the substrate 6 as shown in FIG. 1C.

The CC mask plating process is distinct from a "through-mask" plating process in that in a through-mask plating process the separation of the masking material from the substrate would occur destructively. Furthermore in a through mask plating process, opening in the masking material are typically formed while the masking material is in contact with and adhered to the substrate. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 1D-1G. FIG. 1D shows an anode 12' separated from a mask 8' that includes a patterned conformable material 10' and a support structure 20. FIG. 1D also depicts substrate 6 separated from the mask 8'. FIG. 1E illustrates the mask 8' being brought into contact with the substrate 6. FIG. 1F illustrates the deposit 22' that results from conducting a current from the anode 12' to the substrate 6. FIG. 1G illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the substrate on which plating is to occur (e.g. separate from a three-dimensional (3D) structure that is being formed). CC masks may be formed in a variety of ways, for example, using a photolithographic process. All masks can be generated simultaneously, e.g. prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 2A-2F. These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformal portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 2A illustrates that the passing of current causes material 2 within the plating solution and material 2 from the anode 12 to be selectively transferred to and plated on the substrate 6. After electroplating the first deposition material 2 onto the substrate 6 using CC mask 8, the CC mask 8 is removed as shown in FIG. 2B. FIG. 2C depicts the second deposition material 4 as having been blanket-deposited (i.e. non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 2D. After repetition of this process for all layers, the multi-layer structure 20 formed of the second material 4 (i.e. structural material) is embedded in first material 2 (i.e. sacrificial material) as shown in FIG. 2E. The embedded structure is etched to yield the desired device, i.e. structure 20, as shown in FIG. 2F.

Various components of an exemplary manual electrochemical fabrication system 32 are shown in FIGS. 3A-3C. The system 32 consists of several subsystems 34, 36, 38, and 40. The substrate holding subsystem 34 is depicted in the upper portions of each of FIGS. 3A-3C and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 3A includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source (not shown) for driving the CC masking process.

The blanket deposition subsystem 38 is shown in the lower portion of FIG. 3B and includes several components: (1) an anode 62, (2) an electrolyte tank 64 for holding plating solution 66, and (3) frame 74 on which feet 68 of subsystem 34 may sit. Subsystem 38 also includes appropriate electrical connections (not shown) for connecting the anode to an appropriate power supply (not shown) for driving the blanket deposition process.

The planarization subsystem 40 is shown in the lower portion of FIG. 3C and includes a lapping plate 52 and associated motion and control systems (not shown) for planarizing the depositions.

In addition to teaching the use of CC masks for electrodeposition purposes, the '630 patent also teaches that the CC masks may be placed against a substrate with the polarity of the voltage reversed and material may thereby be selectively removed from the substrate. It indicates that such removal processes can be used to selectively etch, engrave, and polish a substrate, e.g., a plaque.

The '630 patent further indicates that the electroplating methods and articles disclosed therein allow fabrication of devices from thin layers of materials such as, e.g., metals, polymers, ceramics, and semiconductor materials. It further indicates that although the electroplating embodiments described therein have been described with respect to the use of two metals, a variety of materials, e.g., polymers, ceramics and semiconductor materials, and any number of metals can be deposited either by the electroplating methods therein, or in separate processes that occur throughout the electroplating method. It indicates that a thin plating base can be deposited, e.g., by sputtering, over a deposit that is insufficiently conductive (e.g., an insulating layer) so as to enable subsequent electroplating. It also indicates that multiple support materials (i.e. sacrificial materials) can be included in the electroplated element allowing selective removal of the support materials.

The '630 patent additionally teaches that the electroplating methods disclosed therein can be used to manufacture elements having complex microstructure and close tolerances between parts. An example is given with the aid of FIGS. 14A-14E of that patent. In the example, elements having parts that fit with close tolerances, e.g., having gaps between about 1-5 um, including electroplating the parts of the device in an unassembled, preferably pre-aligned, state and once fabricated. In such embodiments, the individual parts can be moved into operational relation with each other or they can simply fall together. Once together the separate parts may be retained by clips or the like.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal layers". This patent teaches the formation of metal structure utilizing through mask exposures. A first layer of a primary metal is electroplated onto an exposed plating base to fill a void in a photoresist (the photoresist forming a through mask having a desired pattern of openings), the photoresist is then removed and a secondary metal is electroplated over the first layer and over the plating base. The exposed surface of the secondary metal is then machined down to a height which exposes the first metal to produce a flat uniform surface extending across both the primary and secondary metals. Formation of a second layer may then begin by applying a photoresist over the first layer and patterning it (i.e. to form a second through mask) and then repeating the process that was used to produce the first layer to produce a second layer of desired configuration. The process is repeated until the entire structure is formed and the secondary metal is removed by etching. The photoresist is formed over the plating base or previous layer by casting and patterning of the photoresist (i.e. voids formed in the photoresist) are formed by exposure of the photoresist through a patterned mask via X-rays or UV radiation and development of the exposed or unexposed areas.

The '637 patent teaches the locating of a plating base onto a substrate in preparation for electroplating materials onto the substrate. The plating base is indicated as typically involving the use of a sputtered film of an adhesive metal, such as chromium or titanium, and then a sputtered film of the metal that is to be plated. It is also taught that the plating base may be applied over an initial layer of sacrificial material (i.e. a layer or coating of a single material) on the substrate so that the structure and substrate may be detached if desired. In such cases after formation of the structure the sacrificial material forming part of each layer of the structure may be removed along the initial sacrificial layer to free the structure. Substrate materials mentioned in the '637 patent include silicon, glass, metals, and silicon with protected semiconductor devices. A specific example of a plating base includes about 150 angstroms of titanium and about 300 angstroms of nickel, both of which are sputtered at a temperature of 160° C. In another example it is indicated that the plating base may consist of 150 angstroms of titanium and 150 angstroms of nickel where both are applied by sputtering.

Electrochemical Fabrication provides the ability to form prototypes and commercial quantities of miniature objects, parts, structures, devices, and the like at reasonable costs and in reasonable times. In fact, Electrochemical Fabrication is an enabler for the formation of many structures that were hitherto impossible to produce. Electrochemical Fabrication opens the spectrum for new designs and products in many industrial fields. Even though Electrochemical Fabrication offers this new capability and it is understood that Electrochemical Fabrication techniques can be combined with designs and structures known within various fields to produce new structures, certain uses for Electrochemical Fabrication provide designs, structures, capabilities and/or features not known or obvious in view of the state of the art.

A need exists in various fields for miniature devices having improved characteristics, reduced fabrication times, reduced fabrication costs, simplified fabrication processes, greater versatility in device design, improved selection of materials, improved material properties, more cost effective and less risky production of such devices, and/or more independence between geometric configuration and the selected fabrication process. In particular, a need exists for micro devices, systems and methods that may be used for security and/or to deter counterfeiting of genuine goods, and to provide a means of determining whether particular goods are genuine rather than counterfeited.

SUMMARY OF THE DISCLOSURE

According to a first aspect of the disclosure, a counterfeiting deterrent device is provided with a plurality of layers formed by an additive process. Each of the layers may have a thickness of less than 100 microns. At least one of the layers has a series of indentations formed in an outer edge of the layer such that the indentations can be observed to verify that the device originated from a predetermined source.

According to another implementation, a counterfeiting deterrent device is provided with at least one raised layer having outer edges in the shape of a logo. A light source is configured and arranged to shine a light through a slit in a substrate layer of the device and past an intermediate layer to light up the outer edge of the raised layer. The layers of the device are formed by an additive process and have a thickness of less than 100 microns each.

The present disclosure provides additional anti-counterfeiting parts and methods for fabricating such anti-counterfeiting parts from a plurality of layers of deposited material with each successive layer comprising at least two materials, at least one of which is a structural material and at least one other of which is a sacrificial material, and wherein each successive layer defines a successive cross-section of the three-dimensional part, and wherein the forming of each of the plurality of successive layers includes: (i) depositing a first of the at least two materials; (ii) depositing a second of the at least two materials; and (B) after the forming of the plurality of successive layers, separating at least a portion of the sacrificial material from the structural material to reveal the three-dimensional part. In some embodiments each layer is also planarized at least once (e.g. by lapping, CMP, fly cutting, or other machining, chemical, or thermal process) to set a boundary level between that layer and a subsequent layer to be formed.

According to aspects of the disclosure, an improved method is provided for forming anti-counterfeiting parts, which have visually observable first configurations that provide anti-counterfeiting functionality that is produced by an enabling or barrier technology that is not generally available.

According to aspects of the disclosure, an improved method is provided for forming anti-counterfeiting parts, which have a visually observable first configuration in the presence of reflected light and a visually observable second configuration, which is different from the first configuration, in the presence of light that is transmitted through passages within the part wherein one or both the first and second configurations provide an anti-counterfeiting functionality and wherein the features that yield the first and second configurations are produced by an enabling or barrier technology that is not generally available.

According to aspects of the disclosure, an improved method is provided for forming anti-counterfeiting parts, which have optical reflectance properties or transmission properties relative to an incident light that are machine readable and provide an anti-counterfeiting functionality that is produced by an enabling or barrier technology that is not generally available.

According to aspects of the disclosure, an improved method is provided for forming anti-counterfeiting parts, which have optical reflectance properties or transmission properties relative to an incident light that are provide an anti-counterfeiting functionality in the form of predefined interference or diffraction patterns that can be recognized visually and/or or by machine by wherein the features that yield the patterns are produced by an enabling or barrier technology that is not generally available.

According to aspects of the disclosure, an improved method is provided for forming anti-counterfeiting parts, which have optical reflectance properties or transmission properties that result in images that can be seen only at selected predefined angles, or distances, or cannot be seen at selected predefined angles, or distances, to provide an anti-counterfeiting functionality wherein the features that provide the images are produced by an enabling or barrier technology that is not generally available.

According to aspects of the disclosure, an improved method is provided for forming anti-counterfeiting parts, which have optical reflectance properties or transmission properties that result in images that have a different color or colors than an incident color or colors wherein the features that provide the images are produced by an enabling or barrier technology that is not generally available.

According to aspects of the disclosure, an improved method is provided for forming anti-counterfeiting parts, which have imaging properties that are different for different selected radiation wavelengths (e.g. X-ray versus visual) wherein the features that give rise to the different imaging properties are produced by an enabling or barrier technology that is not generally available.

According to aspects of the disclosure, an improved method is provided for forming anti-counterfeiting parts, which have image producing properties that are different in the presence of different stimuli or quantities of stimulus (heating, magnetic fields, electric fields, vibration, movement wherein the features that give rise to the variations are produced by an enabling or barrier technology that is not generally available.

Other aspects of the disclosure will be understood by those of skill in the art upon review of the teachings herein. Other aspects of the disclosure may involve combinations of the above noted aspects of the disclosure. Other aspects of the disclosure may involve apparatus or systems that can be used in implementing one or more of the above method aspects of the disclosure. These other aspects of the disclosure may provide various combinations of the aspects presented above as well as provide other configurations, structures, functional relationships, and processes that have not been specifically set forth above.

BRIEF DESCRIPTION OF THE DRAWINGS

FIGS. 4A-4F schematically depict the formation of a first layer of a structure using adhered mask plating where the blanket deposition of a second material overlays both the openings between deposition locations of a first material and the first material itself FIG. 4G depicts the completion of formation of the first layer resulting from planarizing the deposited materials to a desired level.

FIGS. 4H and 4I respectively depict the state of the process after formation of the multiple layers of the structure and after release of the structure from the sacrificial material.

FIG. 20 is a perspective view showing a slit pattern of the system of FIG. 19, and an inset showing an enlarged view of a portion of the slit pattern.

FIGS. 21A-21B are enlarged perspective views similar to FIG. 20 depicting motion of a middle section of the slit pattern.

FIG. 24 is a side view showing the device of FIG. 23 after being further rotated.

FIG. 25 is a side view showing the device of FIG. 24 after being further rotated.

FIG. 26 is a side view showing the device of FIG. 23 after being rotated.

DETAILED DESCRIPTION

Electrochemical Fabrication in General

Figure 1A:
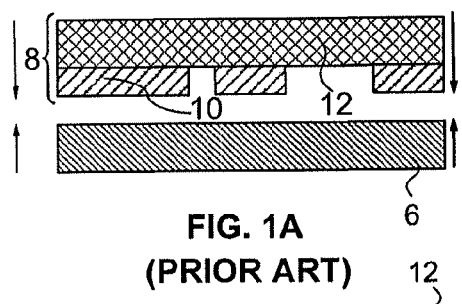
FIGS. 1A-1C schematically depict side views of various stages of a CC mask plating process, while FIGS. 1D-G schematically depict a side views of various stages of a CC mask plating process using a different type of CC mask.
Figure 1B:
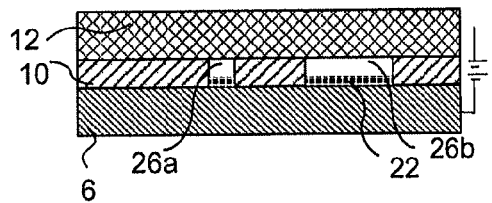
Figure 1C:
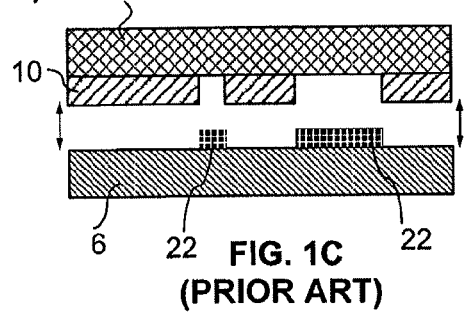
Figure 1D:
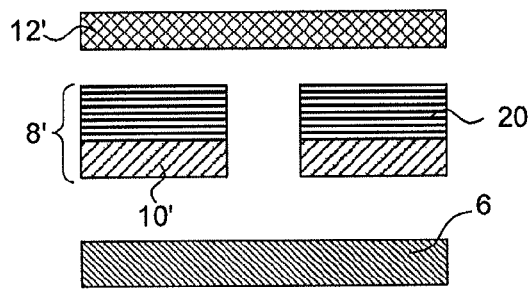
Figure 1E:
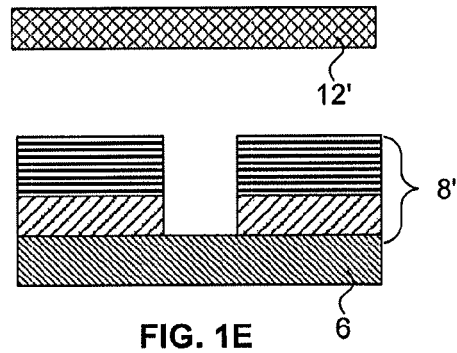
Figure 1F:
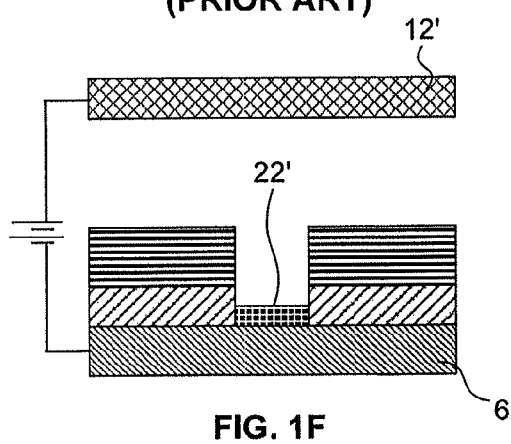
Figure 1G:
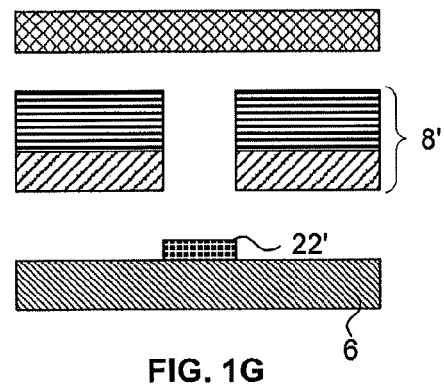
Figure 2A:
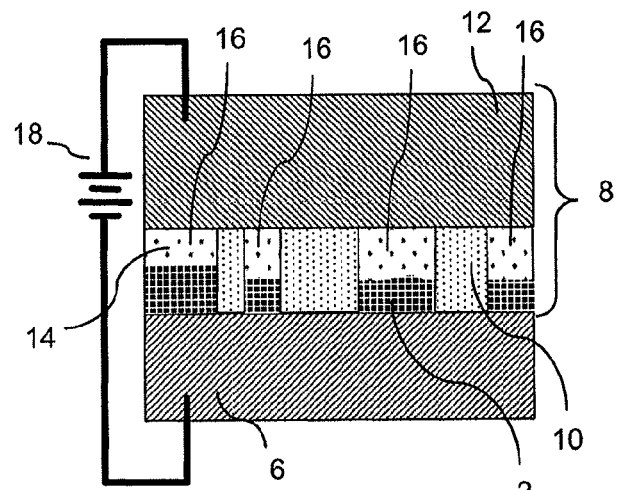
FIGS. 2A-2F schematically depict side views of various stages of an electrochemical fabrication process as applied to the formation of a particular structure where a sacrificial material is selectively deposited while a structural material is blanket deposited.
Figure 2B:
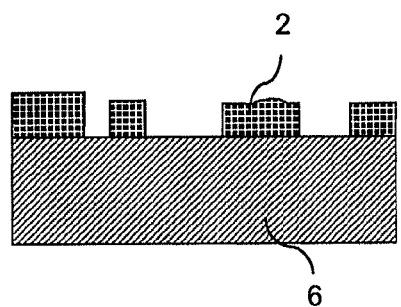
Figure 2C:
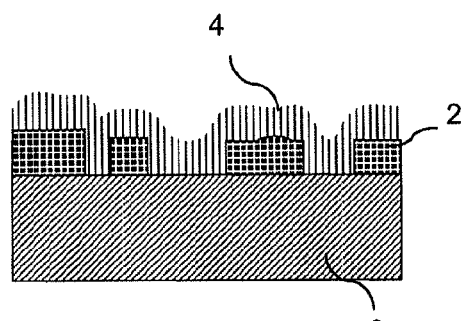
Figure 2D:
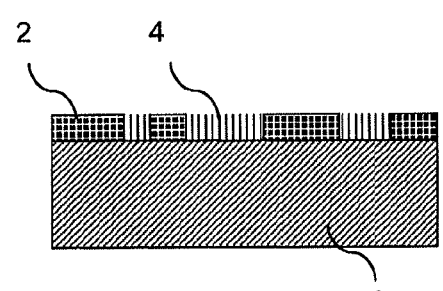
Figure 2E:
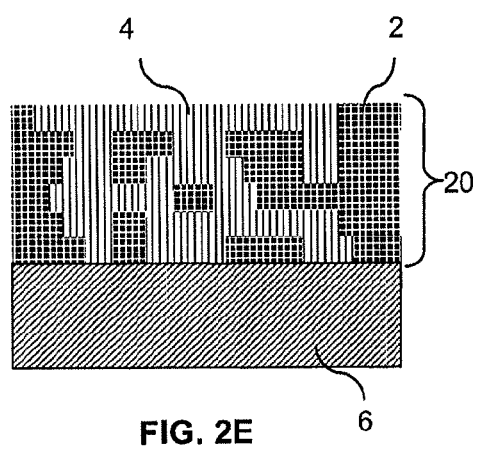
Figure 2F:
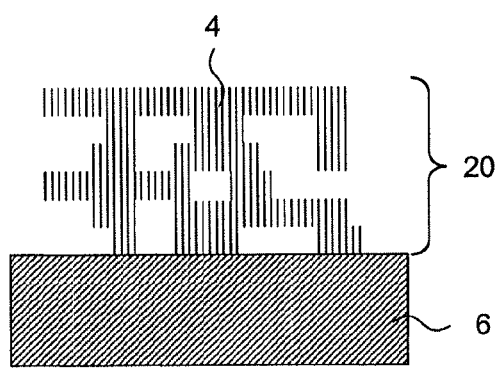
Figure 3A:
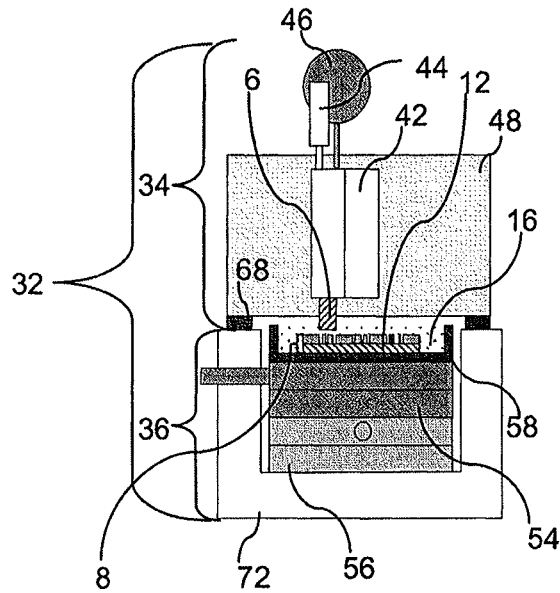
FIGS. 3A-3C schematically depict side views of various example subassemblies that may be used in manually implementing the electrochemical fabrication method depicted in FIGS. 2A-2F.
Figure 3B:
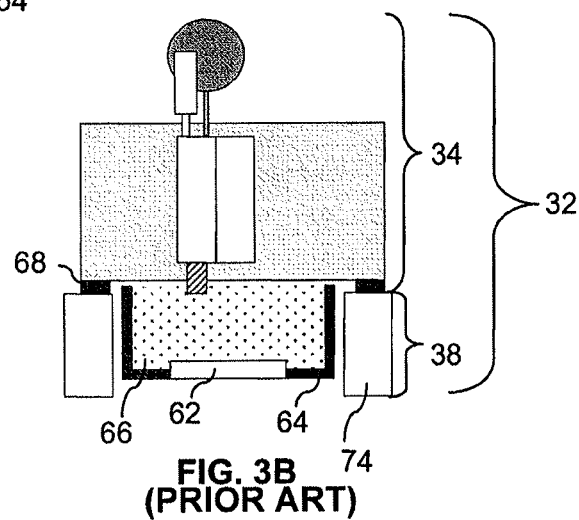
Figure 3C:
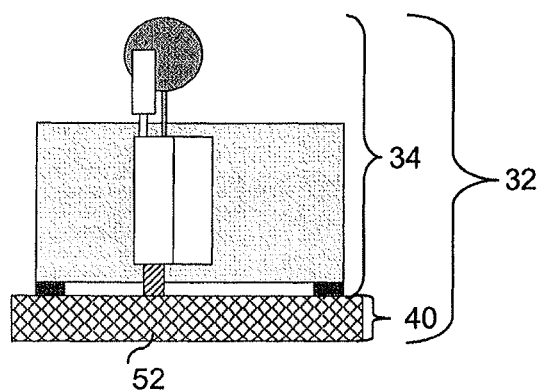

FIGS. 1A-1G, 2A-2F, and 3A-3C illustrate various features of one form of electrochemical fabrication. Other electrochemical fabrication techniques are set forth in the '630 patent referenced above, in the various previously incorporated publications, in various other patents and patent applications incorporated herein by reference. Still others may be derived from combinations of various approaches described in these publications, patents, and applications, or are otherwise known or ascertainable by those of skill in the art from the teachings set forth herein. All of these techniques may be combined with those of the various embodiments of various aspects of the disclosure to yield enhanced embodiments. Still other embodiments may be derived from combinations of the various embodiments explicitly set forth herein.

FIGS. 4A-4I illustrate various stages in the formation of a single layer of a multi-layer fabrication process where a second metal is deposited on a first metal as well as in openings in the first metal so that the first and second metal form part of the layer. In FIG. 4A a side view of a substrate 82 is shown, onto which patternable photoresist 84 is cast as shown in FIG. 4B. In FIG. 4C, a pattern of resist is shown that results from the curing, exposing, and developing of the resist. The patterning of the photoresist 84 results in openings or apertures 92(a)-92(c) extending from a surface 86 of the photoresist through the thickness of the photoresist to surface 88 of the substrate 82. In FIG. 4D a metal 94 (e.g. nickel) is shown as having been electroplated into the openings 92(a)-92(c). In FIG. 4E the photoresist has been removed (i.e. chemically stripped) from the substrate to expose regions of the substrate 82 which are not covered with the first metal 94. In FIG. 4F a second metal 96 (e.g. silver) is shown as having been blanket electroplated over the entire exposed portions of the substrate 82 (which is conductive) and over the first metal 94 (which is also conductive). FIG. 4G depicts the completed first layer of the structure which has resulted from the planarization of the first and second metals down to a height that exposes the first metal and sets a thickness for the first layer. In FIG. 4H the result of repeating the process steps shown in FIGS. 4B-4 G several times to form a multi-layer structure are shown where each layer consists of two materials. For most applications, one of these materials is removed as shown in FIG. 4I to yield a desired 3-D structure 98 (e.g. component or device).

Various embodiments of various aspects of the disclosure are directed to formation of three-dimensional structures from materials some of which may be electrodeposited or electroless deposited. Some of these structures may be formed form a single build level formed from one or more deposited materials while others are formed from a plurality of build layers each including at least two materials (e.g. two or more layers, more preferably five or more layers, and most preferably ten or more layers). In some embodiments, layer thicknesses may be as small as one micron or as large as fifty microns. In other embodiments, thinner layers may be used while in other embodiments, thicker layers may be used. In some embodiments structures having features positioned with micron level precision and minimum features size on the order of tens of microns are to be formed. In other embodiments structures with less precise feature placement and/or larger minimum features may be formed. In still other embodiments, higher precision and smaller minimum feature sizes may be desirable. In the present application meso-scale and millimeter scale have the same meaning and refer to devices that may have one or more dimensions extending into the 0.5-20 millimeter range, or somewhat larger and with features positioned with precision in the 10-100 micron range and with minimum features sizes on the order of 100 microns.

The various embodiments, alternatives, and techniques disclosed herein may form multi-layer structures using a single patterning technique on all layers or using different patterning techniques on different layers. For example, various embodiments of the disclosure may perform selective patterning operations using conformable contact masks and masking operations (i.e. operations that use masks which are contacted to but not adhered to a substrate), proximity masks and masking operations (i.e. operations that use masks that at least partially selectively shield a substrate by their proximity to the substrate even if contact is not made), non-conformable masks and masking operations (i.e. masks and operations based on masks whose contact surfaces are not significantly conformable), and/or adhered masks and masking operations (masks and operations that use masks that are adhered to a substrate onto which selective deposition or etching is to occur as opposed to only being contacted to it). Conformable contact masks, proximity masks, and non-conformable contact masks share the property that they are preformed and brought to, or in proximity to, a surface which is to be treated (i.e. the exposed portions of the surface are to be treated). These masks can generally be removed without damaging the mask or the surface that received treatment to which they were contacted, or located in proximity to. Adhered masks are generally formed on the surface to be treated (i.e. the portion of that surface that is to be masked) and bonded to that surface such that they cannot be separated from that surface without being completely destroyed damaged beyond any point of reuse. Adhered masks may be formed in a number of ways including (1) by application of a photoresist, selective exposure of the photoresist, and then development of the photoresist, (2) selective transfer of pre-patterned masking material, and/or (3) direct formation of masks from computer controlled depositions of material.

Patterning operations may be used in selectively depositing material and/or may be used in the selective etching of material. Selectively etched regions may be selectively filled in or filled in via blanket deposition, or the like, with a different desired material. In some embodiments, the layer-by-layer build up may involve the simultaneous formation of portions of multiple layers. In some embodiments, depositions made in association with some layer levels may result in depositions to regions associated with other layer levels (i.e. regions that lie within the top and bottom boundary levels that define a different layer's geometric configuration). Such use of selective etching and interlaced material deposition in association with multiple layers is described in U.S. patent application Ser. No. 10/434,519, by Smalley, now U.S. Pat. No. 7,252,861, and entitled "Methods of and Apparatus for Electrochemically Fabricating Structures Via Interlaced Layers or Via Selective Etching and Filling of Voids layer elements" which is hereby incorporated herein by reference as if set forth in full.

Temporary substrates on which structures may be formed may be of the sacrificial-type (i.e. destroyed or damaged during separation of deposited materials to the extent they can not be reused), non-sacrificial-type (i.e. not destroyed or excessively damaged, i.e. not damaged to the extent they may not be reused, e.g. with a sacrificial or release layer located between the substrate and the initial layers of a structure that is formed). Non-sacrificial substrates may be considered reusable, with little or no rework (e.g. replanarizing one or more selected surfaces or applying a release layer, and the like) though they may or may not be reused for a variety of reasons.

Definitions

This section of the specification is intended to set forth definitions for a number of specific terms that may be useful in describing the subject matter of the various embodiments of the disclosure. It is believed that the meanings of most if not all of these terms is clear from their general use in the specification but they are set forth hereinafter to remove any ambiguity that may exist. It is intended that these definitions be used in understanding the scope and limits of any claims that use these specific terms. As far as interpretation of the claims of this patent disclosure are concerned, it is intended that these definitions take presence over any contradictory definitions or allusions found in any materials which are incorporated herein by reference.

"Build" as used herein refers, as a verb, to the process of building a desired structure or plurality of structures from a plurality of applied or deposited materials which are stacked and adhered upon application or deposition or, as a noun, to the physical structure or structures formed from such a process. Depending on the context in which the term is used, such physical structures may include a desired structure embedded within a sacrificial material or may include only desired physical structures which may be separated from one another or may require dicing and/or slicing to cause separation.

"Build axis" or "build orientation" is the axis or orientation that is substantially perpendicular to substantially planar levels of deposited or applied materials that are used in building up a structure. The planar levels of deposited or applied materials may be or may not be completely planar but are substantially so in that the overall extent of their cross-sectional dimensions are significantly greater than the height of any individual deposit or application of material (e.g. 100, 500, 1000, 5000, or more times greater). The planar nature of the deposited or applied materials may come about from use of a process that leads to planar deposits or it may result from a planarization process (e.g. a process that includes mechanical abrasion, e.g. lapping, fly cutting, grinding, or the like) that is used to remove material regions of excess height. Unless explicitly noted otherwise, "vertical" as used herein refers to the build axis or nominal build axis (if the layers are not stacking with perfect registration) while "horizontal" refers to a direction within the plane of the layers (i.e. the plane that is substantially perpendicular to the build axis).

"Build layer" or "layer of structure" as used herein does not refer to a deposit of a specific material but instead refers to a region of a build located between a lower boundary level and an upper boundary level which generally defines a single cross-section of a structure being formed or structures which are being formed in parallel. Depending on the details of the actual process used to form the structure, build layers are generally formed on and adhered to previously formed build layers. In some processes the boundaries between build layers are defined by planarization operations which result in successive build layers being formed on substantially planar upper surfaces of previously formed build layers. In some embodiments, the substantially planar upper surface of the preceding build layer may be textured to improve adhesion between the layers. In other build processes, openings may exist in or be formed in the upper surface of a previous but only partially formed build layers such that the openings in the previous build layers are filled with materials deposited in association with current build layers which will cause interlacing of build layers and material deposits. Such interlacing is described in U.S. patent application Ser. No. 10/434,519 now U.S. Pat. No. 7,252,861. This referenced application is incorporated herein by reference as if set forth in full. In most embodiments, a build layer includes at least one primary structural material and at least one primary sacrificial material. However, in some embodiments, two or more primary structural materials may be used without a primary sacrificial material (e.g. when one primary structural material is a dielectric and the other is a conductive material). In some embodiments, build layers are distinguishable from each other by the source of the data that is used to yield patterns of the deposits, applications, and/or etchings of material that form the respective build layers. For example, data descriptive of a structure to be formed which is derived from data extracted from different vertical levels of a data representation of the structure define different build layers of the structure. The vertical separation of successive pairs of such descriptive data may define the thickness of build layers associated with the data. As used herein, at times, "build layer" may be loosely referred simply as "layer". In many embodiments, deposition thickness of primary structural or sacrificial materials (i.e. the thickness of any particular material after it is deposited) is generally greater than the layer thickness and a net deposit thickness is set via one or more planarization processes which may include, for example, mechanical abrasion (e.g. lapping, fly cutting, polishing, and the like) and/or chemical etching (e.g. using selective or non-selective etchants). The lower boundary and upper boundary for a build layer may be set and defined in different ways. From a design point of view they may be set based on a desired vertical resolution of the structure (which may vary with height). From a data manipulation point of view, the vertical layer boundaries may be defined as the vertical levels at which data descriptive of the structure is processed or the layer thickness may be defined as the height separating successive levels of cross-sectional data that dictate how the structure will be formed. From a fabrication point of view, depending on the exact fabrication process used, the upper and lower layer boundaries may be defined in a variety of different ways. For example by planarization levels or effective planarization levels (e.g. lapping levels, fly cutting levels, chemical mechanical polishing levels, mechanical polishing levels, vertical positions of structural and/or sacrificial materials after relatively uniform etch back following a mechanical or chemical mechanical planarization process). For example, by levels at which process steps or operations are repeated. At levels at which, at least theoretically, lateral extends of structural material can be changed to define new cross-sectional features of a structure.

"Layer thickness" is the height along the build axis between a lower boundary of a build layer and an upper boundary of that build layer.

"Planarization" is a process that tends to remove materials, above a desired plane, in a substantially non-selective manner such that all deposited materials are brought to a substantially common height or desired level (e.g. within 20%, 10%, 5%, or even 1% of a desired layer boundary level). For example, lapping removes material in a substantially non-selective manner though some amount of recession one material or another may occur (e.g. copper may recess relative to nickel). Planarization may occur primarily via mechanical means, e.g. lapping, grinding, fly cutting, milling, sanding, abrasive polishing, frictionally induced melting, other machining operations, or the like (i.e. mechanical planarization). Mechanical planarization maybe followed or proceeded by thermally induced planarization (.e.g. melting) or chemically induced planarization (e.g. etching). Planarization may occur primarily via a chemical and/or electrical means (e.g. chemical etching, electrochemical etching, or the like). Planarization may occur via a simultaneous combination of mechanical and chemical etching (e.g. chemical mechanical polishing (CMP)).

"Structural material" as used herein refers to a material that remains part of the structure when put into use.

"Supplemental structural material" as used herein refers to a material that forms part of the structure when the structure is put to use but is not added as part of the build layers but instead is added to a plurality of layers simultaneously (e.g. via one or more coating operations that applies the material, selectively or in a blanket fashion, to a one or more surfaces of a desired build structure that has been released from a sacrificial material.

"Primary structural material" as used herein is a structural material that forms part of a given build layer and which is typically deposited or applied during the formation of that build layer and which makes up more than 20% of the structural material volume of the given build layer. In some embodiments, the primary structural material may be the same on each of a plurality of build layers or it may be different on different build layers. In some embodiments, a given primary structural material may be formed from two or more materials by the alloying or diffusion of two or more materials to form a single material.

"Secondary structural material" as used herein is a structural material that forms part of a given build layer and is typically deposited or applied during the formation of the given build layer but is not a primary structural material as it individually accounts for only a small volume of the structural material associated with the given layer. A secondary structural material will account for less than 20% of the volume of the structural material associated with the given layer. In some preferred embodiments, each secondary structural material may account for less than 10%, 5%, or even 2% of the volume of the structural material associated with the given layer. Examples of secondary structural materials may include seed layer materials, adhesion layer materials, barrier layer materials (e.g. diffusion barrier material), and the like. These secondary structural materials are typically applied to form coatings having thicknesses less than 2 microns, 1 micron, 0.5 microns, or even 0.2 microns). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Functional structural material" as used herein is a structural material that would have been removed as a sacrificial material but for its actual or effective encapsulation by other structural materials. Effective encapsulation refers, for example, to the inability of an etchant to attack the functional structural material due to inaccessibility that results from a very small area of exposure and/or due to an elongated or tortuous exposure path. For example, large (10,000 µm2) but thin (e.g. less than 0.5 microns) regions of sacrificial copper sandwiched between deposits of nickel may define regions of functional structural material depending on ability of a release etchant to remove the sandwiched copper.

"Sacrificial material" is material that forms part of a build layer but is not a structural material. Sacrificial material on a given build layer is separated from structural material on that build layer after formation of that build layer is completed and more generally is removed from a plurality of layers after completion of the formation of the plurality of layers during a "release" process that removes the bulk of the sacrificial material or materials. In general sacrificial material is located on a build layer during the formation of one, two, or more subsequent build layers and is thereafter removed in a manner that does not lead to a planarized surface. Materials that are applied primarily for masking purposes, i.e. to allow subsequent selective deposition or etching of a material, e.g. photoresist that is used in forming a build layer but does not form part of the build layer) or that exist as part of a build for less than one or two complete build layer formation cycles are not considered sacrificial materials as the term is used herein but instead shall be referred as masking materials or as temporary materials. These separation processes are sometimes referred to as a release process and may or may not involve the separation of structural material from a build substrate. In many embodiments, sacrificial material within a given build layer is not removed until all build layers making up the three-dimensional structure have been formed. Of course sacrificial material may be, and typically is, removed from above the upper level of a current build layer during planarization operations during the formation of the current build layer. Sacrificial material is typically removed via a chemical etching operation but in some embodiments may be removed via a melting operation or electrochemical etching operation. In typical structures, the removal of the sacrificial material (i.e. release of the structural material from the sacrificial material) does not result in planarized surfaces but instead results in surfaces that are dictated by the boundaries of structural materials located on each build layer. Sacrificial materials are typically distinct from structural materials by having different properties therefrom (e.g. chemical etchability, hardness, melting point, etc.) but in some cases, as noted previously, what would have been a sacrificial material may become a structural material by its actual or effective encapsulation by other structural materials. Similarly, structural materials may be used to form sacrificial structures that are separated from a desired structure during a release process via the sacrificial structures being only attached to sacrificial material or potentially by dissolution of the sacrificial structures themselves using a process that is insufficient to reach structural material that is intended to form part of a desired structure. It should be understood that in some embodiments, small amounts of structural material may be removed, after or during release of sacrificial material. Such small amounts of structural material may have been inadvertently formed due to imperfections in the fabrication process or may result from the proper application of the process but may result in features that are less than optimal (e.g. layers with stairs steps in regions where smooth sloped surfaces are desired. In such cases the volume of structural material removed is typically minuscule compared to the amount that is retained and thus such removal is ignored when labeling materials as sacrificial or structural. Sacrificial materials are typically removed by a dissolution process, or the like, that destroys the geometric configuration of the sacrificial material as it existed on the build layers. In many embodiments, the sacrificial material is a conductive material such as a metal. As will be discussed hereafter, masking materials though typically sacrificial in nature are not termed sacrificial materials herein unless they meet the required definition of sacrificial material.

"Supplemental sacrificial material" as used herein refers to a material that does not form part of the structure when the structure is put to use and is not added as part of the build layers but instead is added to a plurality of layers simultaneously (e.g. via one or more coating operations that applies the material, selectively or in a blanket fashion, to a one or more surfaces of a desired build structure that has been released from an initial sacrificial material. This supplemental sacrificial material will remain in place for a period of time and/or during the performance of certain post layer formation operations, e.g. to protect the structure that was released from a primary sacrificial material, but will be removed prior to putting the structure to use.

"Primary sacrificial material" as used herein is a sacrificial material that is located on a given build layer and which is typically deposited or applied during the formation of that build layer and which makes up more than 20% of the sacrificial material volume of the given build layer. In some embodiments, the primary sacrificial material may be the same on each of a plurality of build layers or may be different on different build layers. In some embodiments, a given primary sacrificial material may be formed from two or more materials by the alloying or diffusion of two or more materials to form a single material.

"Secondary sacrificial material" as used herein is a sacrificial material that is located on a given build layer and is typically deposited or applied during the formation of the build layer but is not a primary sacrificial materials as it individually accounts for only a small volume of the sacrificial material associated with the given layer. A secondary sacrificial material will account for less than 20% of the volume of the sacrificial material associated with the given layer. In some preferred embodiments, each secondary sacrificial material may account for less than 10%, 5%, or even 2% of the volume of the sacrificial material associated with the given layer. Examples of secondary structural materials may include seed layer materials, adhesion layer materials, barrier layer materials (e.g. diffusion barrier material), and the like. These secondary sacrificial materials are typically applied to form coatings having thicknesses less than 2 microns, 1 micron, 0.5 microns, or even 0.2 microns). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Adhesion layer", "seed layer", "barrier layer", and the like refer to coatings of material that are thin in comparison to the layer thickness and thus generally form secondary structural material portions or sacrificial material portions of some layers. Such coatings may be applied uniformly over a previously formed build layer, they may be applied over a portion of a previously formed build layer and over patterned structural or sacrificial material existing on a current (i.e. partially formed) build layer so that a non-planar seed layer results, or they may be selectively applied to only certain locations on a previously formed build layer. In the event such coatings are non-selectively applied, selected portions may be removed (1) prior to depositing either a sacrificial material or structural material as part of a current layer or (2) prior to beginning formation of the next layer or they may remain in place through the layer build up process and then etched away after formation of a plurality of build layers.

"Masking material" is a material that may be used as a tool in the process of forming a build layer but does not form part of that build layer. Masking material is typically a photopolymer or photoresist material or other material that may be readily patterned. Masking material is typically a dielectric. Masking material, though typically sacrificial in nature, is not a sacrificial material as the term is used herein. Masking material is typically applied to a surface during the formation of a build layer for the purpose of allowing selective deposition, etching, or other treatment and is removed either during the process of forming that build layer or immediately after the formation of that build layer.

"Multilayer structures" are structures formed from multiple build layers of deposited or applied materials.

"Multilayer three-dimensional (or 3D or 3-D) structures" are Multilayer Structures that meet at least one of two criteria: (1) the structural material portion of at least two layers of which one has structural material portions that do not overlap structural material portions of the other.

"Complex multilayer three-dimensional (or 3D or 3-D) structures" are multilayer three-dimensional structures formed from at least three layers where a line may be defined that hypothetically extends vertically through at least some portion of the build layers of the structure will extend from structural material through sacrificial material and back through structural material or will extend from sacrificial material through structural material and back through sacrificial material (these might be termed vertically complex multilayer three-dimensional structures). Alternatively, complex multilayer three-dimensional structures may be defined as multilayer three-dimensional structures formed from at least two layers where a line may be defined that hypothetically extends horizontally through at least some portion of a build layer of the structure that will extend from structural material through sacrificial material and back through structural material or will extend from sacrificial material through structural material and back through sacrificial material (these might be termed horizontally complex multilayer three-dimensional structures). Worded another way, in complex multilayer three-dimensional structures, a vertically or horizontally extending hypothetical line will extend from one or structural material or void (when the sacrificial material is removed) to the other of void or structural material and then back to structural material or void as the line is traversed along at least a portion of the line.

"Moderately complex multilayer three-dimensional (or 3D or 3-D) structures" are complex multilayer 3D structures for which the alternating of void and structure or structure and void not only exists along one of a vertically or horizontally extending line but along lines extending both vertically and horizontally.

"Highly complex multilayer (or 3D or 3-D) structures" are complex multilayer 3D structures for which the structure-to-void-to-structure or void-to-structure-to-void alternating occurs once along the line but occurs a plurality of times along a definable horizontally or vertically extending line.

"Up-facing feature" is an element dictated by the cross-sectional data for a given build layer "n" and a next build layer "n+1" that is to be formed from a given material that exists on the build layer "n" but does not exist on the immediately succeeding build layer "n+1". For convenience the term "up-facing feature" will apply to such features regardless of the build orientation.

"Down-facing feature" is an element dictated by the cross-sectional data for a given build layer "n" and a preceding build layer "n−1" that is to be formed from a given material that exists on build layer "n" but does not exist on the immediately preceding build layer "n−1". As with up-facing features, the term "down-facing feature" shall apply to such features regardless of the actual build orientation.

"Continuing region" is the portion of a given build layer "n" that is dictated by the cross-sectional data for the given build layer "n", a next build layer "n+1" and a preceding build layer "n−1" that is neither up-facing nor down-facing for the build layer "n".

"Minimum feature size" or "MFS" refers to a necessary or desirable spacing between structural material elements on a given layer that are to remain distinct in the final device configuration. If the minimum feature size is not maintained for structural material elements on a given layer, the fabrication process may result in structural material inadvertently bridging what were intended to be two distinct elements (e.g. due to masking material failure or failure to appropriately fill voids with sacrificial material during formation of the given layer such that during formation of a subsequent layer structural material inadvertently fills the void). More care during fabrication can lead to a reduction in minimum feature size. Alternatively, a willingness to accept greater losses in productivity (i.e. lower yields) can result in a decrease in the minimum feature size. However, during fabrication for a given set of process parameters, inspection diligence, and yield (successful level of production) a minimum design feature size is set in one way or another. The above described minimum feature size may more appropriately be termed minimum feature size of gaps or voids (e.g. the MFS for sacrificial material regions when sacrificial material is deposited first). Conversely a minimum feature size for structure material regions (minimum width or length of structural material elements) may be specified. Depending on the fabrication method and order of deposition of structural material and sacrificial material, the two types of minimum feature sizes may be the same or different. In practice, for example, using electrochemical fabrication methods as described herein, the minimum features size on a given layer may be roughly set to a value that approximates the layer thickness used to form the layer and it may be considered the same for both structural and sacrificial material widths. In some more rigorously implemented processes (e.g. with higher examination regiments and tolerance for rework), it may be set to an amount that is 80%, 50%, or even 30% of the layer thickness. Other values or methods of setting minimum feature sizes may be used. Worded another way, depending on the geometry of a structure, or plurality of structures, being formed, the structure, or structures, may include elements (e.g. solid regions) which have dimensions smaller than a first minimum feature size and/or have spacings, voids, openings, or gaps (e.g. hollow or empty regions) located between elements, where the spacings are smaller than a second minimum feature size where the first and second minimum feature sizes may be the same or different and where the minimum feature sizes represent lower limits at which formation of elements and/or spacing can be reliably formed. Reliable formation refers to the ability to accurately form or produce a given geometry of an element, or of the spacing between elements, using a given formation process, with a minimum acceptable yield. The minimum acceptable yield may depend on a number of factors including: (1) number of features present per layer, (2) numbers of layers, (3) the criticality of the successful formation of each feature, (4) the number and severity of other factors effecting overall yield, and (5) the desired or required overall yield for the structures or devices themselves. In some circumstances, the minimum size may be determined by a yield requirement per feature which is as low as 70%, 60%, or even 50%. While in other circumstances the yield requirement per feature may be as high as 90%, 95%, 99%, or even higher. In some circumstances (e.g. in producing a filter element) the failure to produce a certain number of desired features (e.g. 20-40% failure may be acceptable while in an electrostatic actuator the failure to produce a single small space between two moveable electrodes may result in failure of the entire device. The MFS, for example, may be defined as the minimum width of a narrow and processing element (e.g. photoresist element or sacrificial material element) or structural element (e.g. structural material element) that may be reliably formed (e.g. 90-99.9 times out of 100) which is either independent of any wider structures or has a substantial independent length (e.g. 200-1000 microns) before connecting to a wider region.

Anti-counterfeiting Devices

Anti-counterfeiting parts or devices produced by the methods of the present application may take a number of different forms and may be incorporated into a variety of products or other devices. Some such parts may have only non-movable passive elements while others may have movable elements. Still others may have active elements. Parts may have authentication elements that are visually detectable, non-visually detectable, or both. Some visually detectable elements include logos (e.g. micro-logos), company names, part numbers, serial numbers, or other meaningful structural configurations. In some embodiments, interrogation of the structural configuration is by optical means (e.g. light) and may include analysis of light exiting a surface that results from incident radiation coming from the same side as an observer. In some embodiments incident radiation may come from a side or backside relative to the exiting light direction. Some devices in which the parts are incorporated may include their own forward, side or backlighting sources while other devices may not. Some parts may include their own light sources and even possibly power sources. Some example electronic devices that may make use of the anti-counterfeiting parts of some of the embodiments of the present disclosure include, for example: cell phones, handheld game systems, laptops, tablet computers, key fobs, GPS systems, hand held music and video systems, and other electronic devices. Some exemplary generally non-electronic devices that may make use of the anti-counterfeiting parts of some of the embodiments of the present disclosure include: jewelry, watches, pens, art works, high end parts for the aerospace industry, cars, medical devices, pharmaceuticals, military equipment, documents, brief cases, and the like.

In some embodiments, the anti-counterfeit parts are incorporated into the product or device itself, attached to the product or device (e.g. via welding), incorporated into device packaging, etc.

As an example, approximately 14 million watches sold in 2007 were counterfeits of Swiss watches. This illustrates a need in the high-end watch industry for watches to include elements which are very difficult to duplicate and which therefore make counterfeiting of the watch more difficult. Such elements are preferably visible on the surface of the watch on or near the face, beneath the watch's crystal (the transparent cover that protects the watch face) so that they are readily observable to the purchaser or dealer of the watch, either with the naked eye or using moderate magnification. However, in some applications either in addition to such visible indicators or as an alternative to such visible indicators, machine readable optical or other output may be extracted from the device to yield an authenticity indicator or a counterfeit conclusion.

Figure 5:
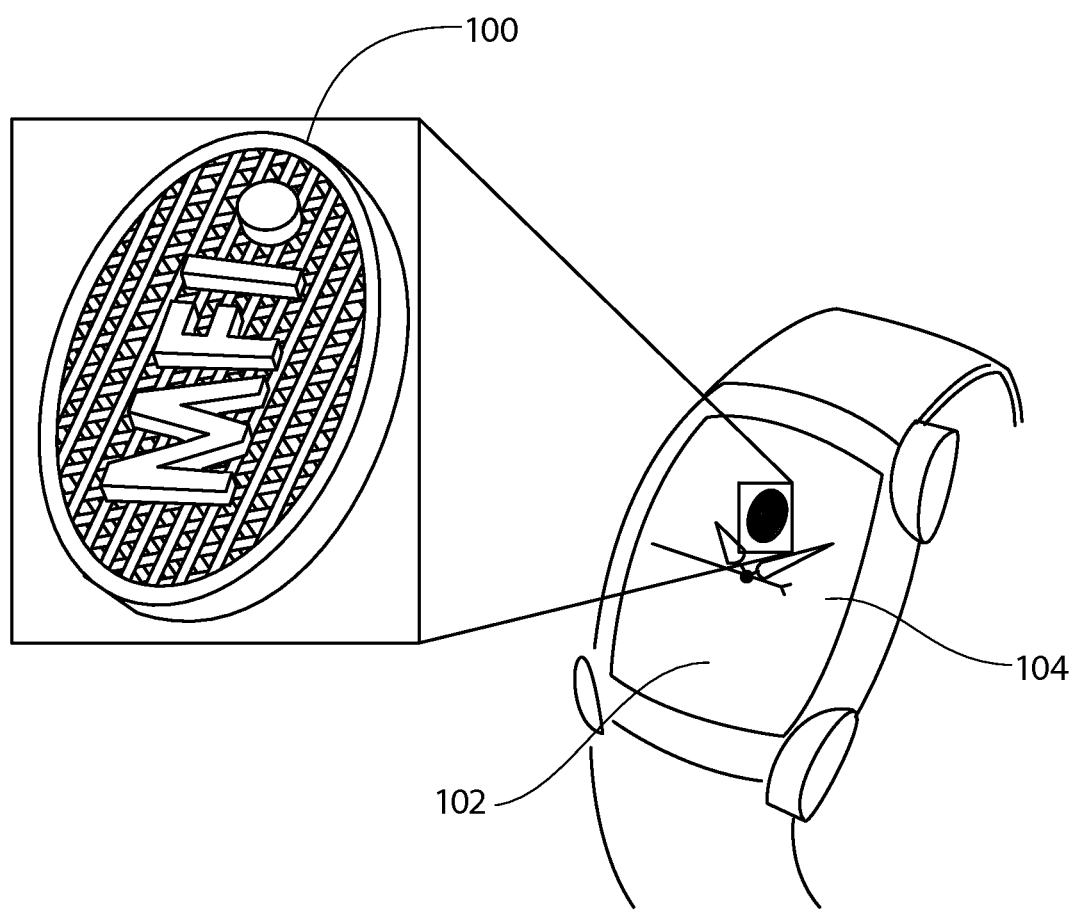
FIG. 5 is a perspective view showing an exemplary anti-counterfeiting structure attached to a watch face.

In some embodiments of the disclosure, a static structure 100 produced from multiple layers of metal using a multi-layer multi-material fabrication technology such as those described herein or incorporated herein by reference is provided; this may be located anywhere on the device to be authenticated (e.g. watch), such as on the face 102 of the watch 104 of FIG. 5. The structure may include any complex 3-D geometry that would be difficult or impossible to fabricate other than by using a multi-layer, metal 3-D process capable of small features (e.g., layer thicknesses in the range of 4-30 μm, minimum features in the range of 10-20 μm or less) with resolution on the order of 2-3 microns or less. In some embodiments, the layer thicknesses may be a large as 100 μm. The exemplary anti-counterfeiting structure 100 shown in FIG. 5. represents the logo of the Swiss watch company Parmigiani Fleurier as an illustrative example only. The MFI logo shown in FIGS. 6 and 7 could be used instead in FIG. 5.

Figure 6:
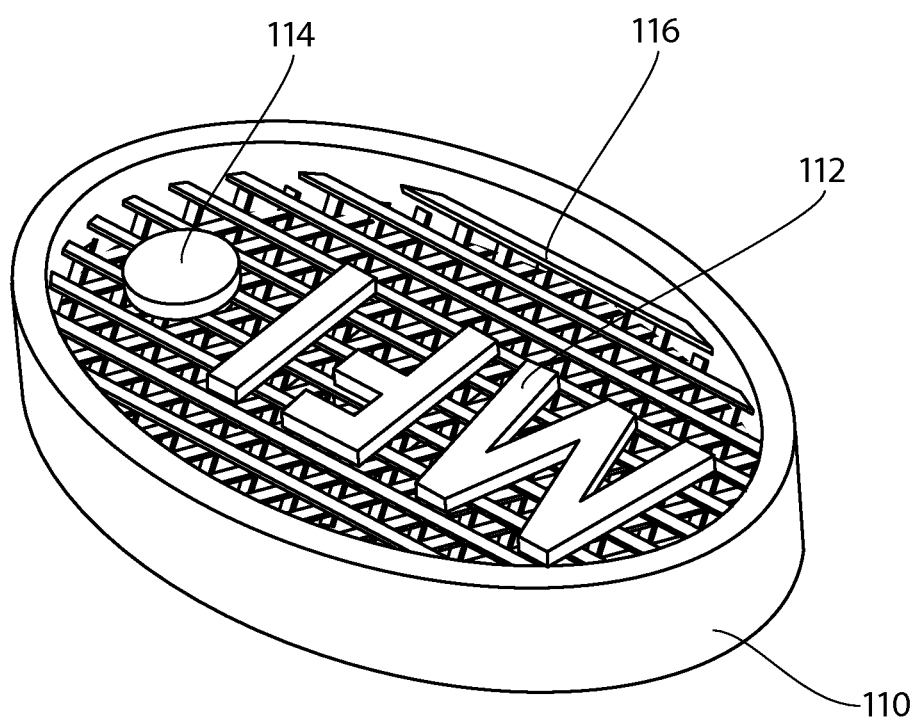
FIG. 6 is a perspective view showing an exemplary anti-counterfeiting structure.
Figure 7:
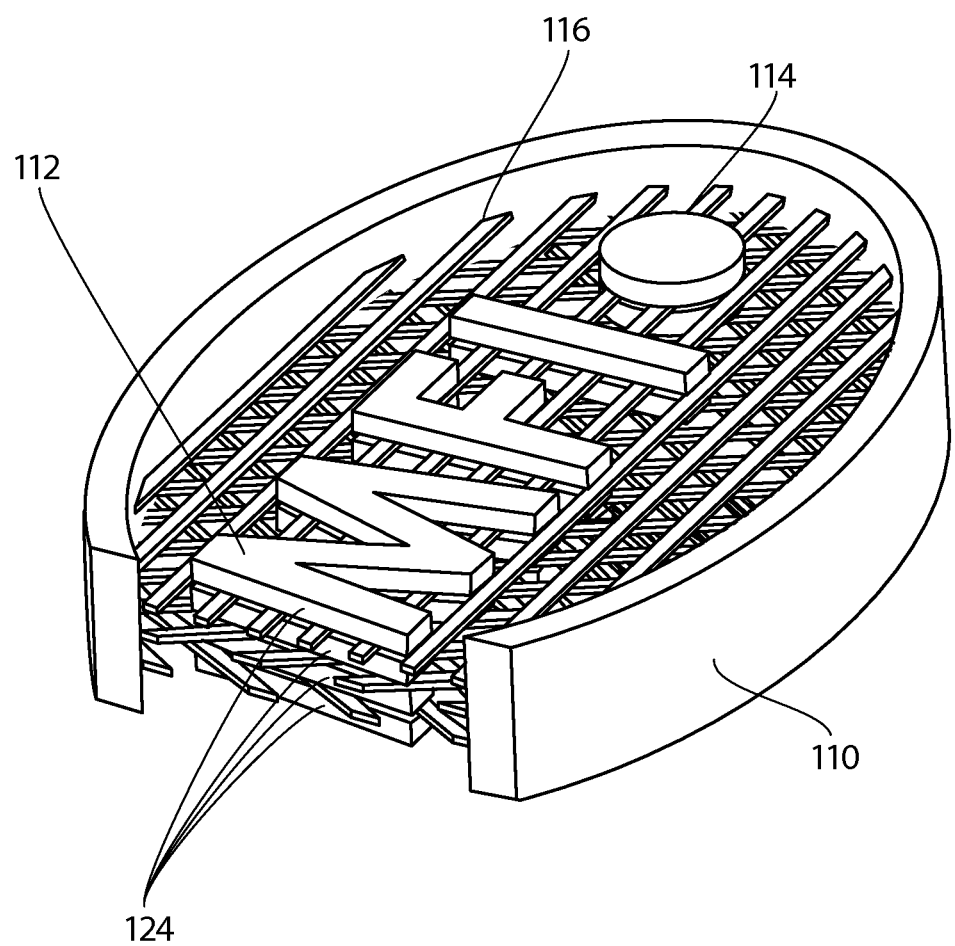
FIG. 7 is a perspective view showing the exemplary anti-counterfeiting structure of FIG. 6 in partial cross-section.

As shown in FIG. 6 and FIG. 7, the geometry of an anti-counterfeit structure 110 may include alphanumeric characters or other character elements 112, geometric elements 114, logos (such as the MFI logo of the applicant shown formed by character elements 112) and/or background elements 116 which form a backdrop or visual contrast with other elements. The structure preferably not only provides an anti-counterfeiting function, but also contributes aesthetically to the device's appearance and, particularly if made of precious materials such as gold, platinum, or palladium, also to the device's value.

FIGS. 6-7 provide an example of a part with character elements 112 corresponding to the letters "MFI", as well as a circular geometric element 114 and background elements 116 having the form of parallel strips with various orientations at different heights within the structure. The character elements 112 may be replicated on multiple tiers 124 separated by background elements 116, as best seen in the cross-section of FIG. 7.

In some embodiments, dynamic parts may be used for anti-counterfeiting and/or for aesthetics or enjoyment of the structure in itself. Such dynamic parts may include one or more components capable of moving independently, relative to one another or relative to the body of the device. Motion may be induced inertially, by shaking the device, by the action of magnetic forces (if the part has magnetic elements) generated by electromagnets or moving permanent magnets within or external to the device, heating or cooling, electric fields, and the like. In some embodiments movement may be initiated by power sources or mechanisms in a device itself. For example, an array of tiny vertical pins which are free to pivot may be suspended above a gear or other rotating element of a watch movement, with the upper portions of the pins visible on the watch face. The gear may be furnished with a protrusion which can lightly "brush" the pins as it traverses across their bottom ends, causing a visible motion of the upper portion of the pins. In some embodiments, a frame suspended by co-fabricated springs contains pins or other small objects that can move when the frame is vibrated. In some cases, e.g. in a watch, a moving protrusion can contact the frame periodically (e.g., once per minute), setting it into vibration and causing a visual display that indicates the passage of time while demonstrating that the watch is authentic and not counterfeited. In some embodiments, in lieu of pins, an array of small mirrors may be provided, and in other embodiments both pins and mirrors may be provided.

Numerous other static or dynamic structures may be formed as desired to serve the purpose of providing anti-counterfeiting protection. In some embodiments the anti-counterfeiting structures may provide no function other than that of identification while in other embodiments, the structures may provide identification in combination with other functionality.

In some embodiments, a device (e.g. a watch) may include micro-meshes, grills, or similar structures made using a multi-layer, multi-material fabrication process, which provide protection of device components while allowing the mechanism to be observed through such structures. In some embodiments, portions of the mechanism may be mounted to these structures for stability. In some embodiments, the multi-layer multi-material fabrication process may be used to fabricate key structural elements of the device as well as of an authentication part. In some embodiments, the multi-layer, multi-material fabrication process may be used to provide filigree or other decorative elements, or mounting structures, including small snap-in structures provided with springs, into which precious stones may be set. Such elements may also be applied to jewelry, such as rings, earrings, brooches, bracelets, and necklaces.

In some embodiments, a multi-layer, multi-material fabrication process may be used to provide functional components of devices (e.g. components of watch movements or even entire movements without need for further assembly). Miniature movements can be useful in complicated watches which display multiple time zones, calendar functions, barometric readings, etc. Anti-counterfeiting parts may be made monolithically, and sometimes even associated devices or device components made at the same time. Parts may include visual display elements with static features, passive but transformable features, driven features or the like (e.g. logos, moving watch hands, dials, or miniature automata, e.g. animated figures of humans and animals). In some embodiments the visual displays may provide images that are visible from reflected light, from back lighting, from mixing different colors of light, from the interference or diffraction of coherent or correlated light sources, or the like. In some devices, optical elements may be located in relation to the multi-layer parts to provide enhanced viewing or light management. In some embodiments the authentication parts may include multiple distinct materials and voids that may be visually distinguished by an observer, buried and observable only as a result of manipulations of incident visual light or other radiation (e.g. X-rays). Parts may include side walls or internal features that provide for light, other radiation, or other stimulus manipulation and may include different materials or textures that provide for further light, other radiation, or other stimulus manipulation (e.g. embedded materials, embedded cavities, textured surfaces, polished surfaces, channels, sidewall features, moveable elements, and the like).

In some embodiments, parts may be provided with structural features that interact with appropriate stimulus to provide for viewable and human interpretable results (e.g. visual images) while in other embodiments results of stimulus may require a machine for reading and accurate interpretation (such as a photocell, bar code reader, CCD array, computer programmed for image recognition and identification). When light or other stimulus interacts with these unique features, a coded response is returned. In the case of the stimulus being ambient or directed light, the reflected, transmitted, or modified light coming from the part may be detected by the human eye, camera or other detection device where the response may be converted to a digital or analog output for further analysis. In the case of other stimulus, other responses may result. For example, pressure applied to a part containing a piezoelectric element or array of piezoelectric elements might provide a voltage or array of voltage responses which may be indicative of the authenticity of the part and associated device. Application of X-rays to the part might show hidden features indicative of the authenticity or the part where the hidden features may be in the form of buried materials or hollow regions. Application of static or dynamic magnetic or electric fields to a part that includes permanent magnets, diamagnetic materials or paramagnetic materials, dielectric materials, and/or conductive materials for predefined conductive paths might provide detectable characteristics indicative of the authenticity of the parts and associated devices.

Figure 8A:
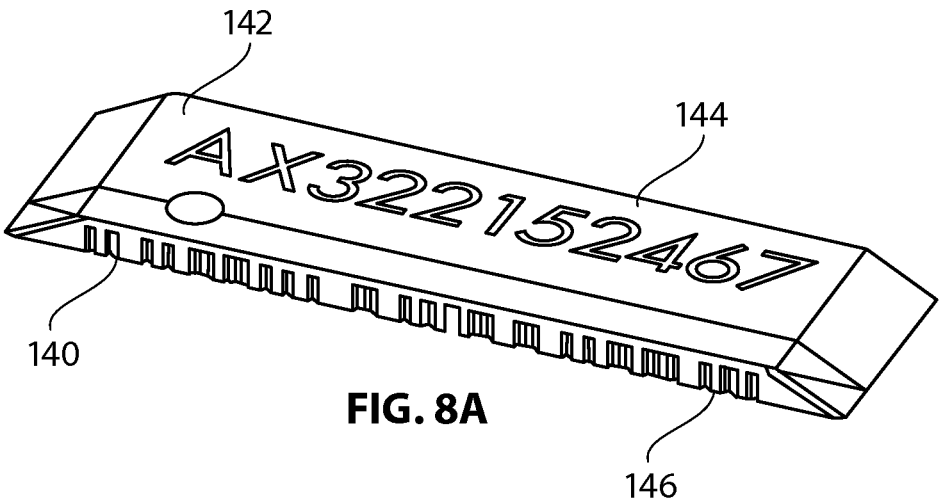
FIG. 8A is a perspective view showing another exemplary anti-counterfeiting structure.
Figure 8B:
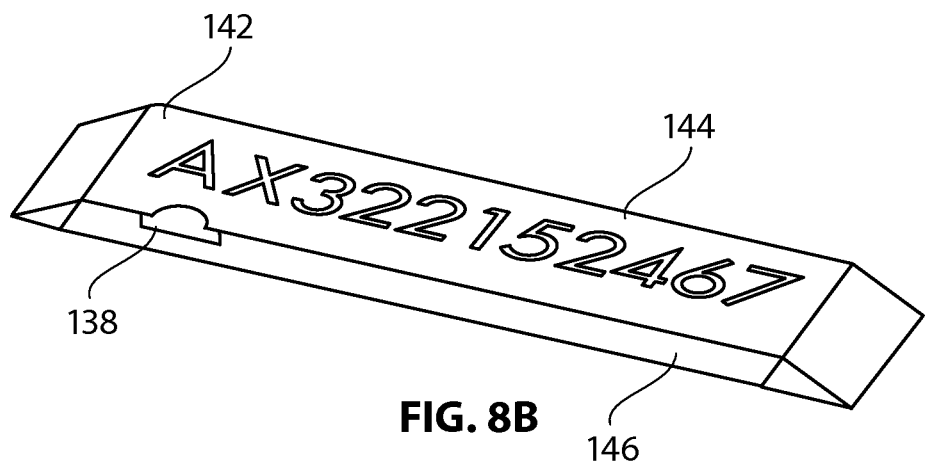
FIG. 8B is a perspective view showing the exemplary anti-counterfeiting structure of FIG. 8A in partial cross-section.
Figure 8C:
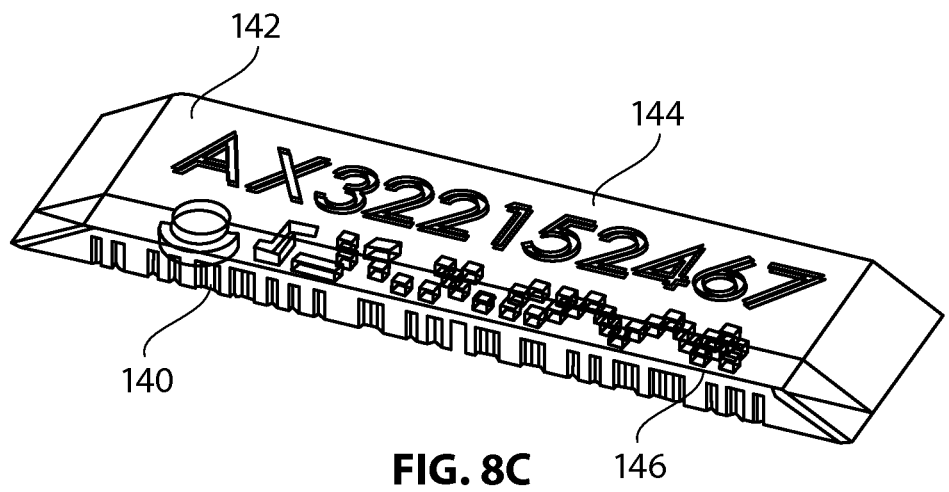
FIG. 8C is a perspective view showing the exemplary anti-counterfeiting structure of FIG. 8A with a transparent edge portion.

In some embodiments, features on layer edges are used to provide authentication. Such features may be used as part of a logo. As shown in FIGS. 8A-8C, undercutting features 138 and channels 140 may be utilized. Such features can leave a face surface 142 unblemished while still providing useful authentication information. Such features can be used in combination with recessed alphanumeric characters 144 or symbols 146 as shown, and/or these characters or symbols may be raised above surface 142 rather than recessed into it. These features can take the form of under cuts in the surface of one layer that is located between two other layers. Such features can receive incident light and by controlling the number, width, height and depth of these features, a unique signature can be deciphered from the reflectance of the light from the surface which can be detected by a person, photocell, barcode reader, or the like and decoding performed to determine authenticity. An edge feature 140 may be an undercut within a layer either below one layer or between two layers. Depending on the shape of the feature it may provide for specular reflectance, diffuse reflectance, partial absorption, and/or passage of light. Edge features may be on outer surfaces of parts or may form internal passages with dead ends, splits, mergers, internal angled reflective surfaces, even or odd numbers of reflections, one or more exist ports, one or more input ports, and the like. Depending on locations, different edge features (and internal passages), may be subjected to different sources of light with different output results. Various edge features are possible including (1) Random, (2) Checkerboard, (3) Chevrons, (4) Stair steps, (5) Barcodes, (6) Morse Code, (7) Binary codes, (8) Custom codes, (9) proprietary codes, and the like.

Edge features can be on the outer surfaces of the layers or on internal surfaces of layers. They can act as conduits for light and can allow light to enter and reemerge through an opening which is the same as the entry port, different from the entry port, either straight cut or set with a ledge forming an undercut. Adding to the complexity of the overall light path from input to output, unique micro optical systems can be created using the versatility of a multi-material electrochemical fabrication process. In some embodiments, edge features can direct light to upper or lower layers, or vice-a-versa, where the output is converted to a unique pattern or code. In some embodiments, when light enters and passes through upper or lower layers of the part, the exiting light creates unique light patterns either by use of a single path or multiple paths for phase shifting after interacting with the edges of structure or opposing layers. In some embodiments, angled filters may be used so that projected images can only be seen in certain angles and blocked at all other angles. In some embodiments, different colors of light may be combined or split to yield different color outputs depending on the colors of the inputs and the configuration of the passages through which they pass. Passage may use only open channels formed in electrodeposited materials or they may include optical elements such as mirrors, prisms, lens, and the like.

In the various light based approaches, interrogation of exiting light patterns may occur in a variety of different ways. In some embodiments a human may be used to provide the interpretation with or without image enhancements (e.g. microscopes, filters, etc.) and with or without coded look up tables. In some embodiments, light can be piped into channels and exiting light patterns can be read with a photo array and analyzed by a programmed computer or hardwired circuit. In some embodiments, a microscope and an observer can be used to compare surface patterns with known patterns for a go/no-go method. In some embodiments, a bar code reader or laser reflective scanner can be used to read patterns and convert information to data. In some embodiments, a vision system with pattern recognition can be used for an automated approach to deciphering the reflection from complex patterns.

As noted above, in some embodiments parts with variable configurations may be used to provide altered outputs which may in turn be used to provide a first level of authentication or used to provide a second, third, or even a higher level of authentication. Configurations of alternating part elements may include, in addition to those noted above, one or more of (1) a reed-like switch, (2) a toggle, (3) a slide, and (4) a hinge.

In some embodiments, parts may be fabricated to include passive and active components for activating or reading signals from light, EM fields, voltages, currents, air pressure, etc. In some embodiments, a part surface may be patterned or textured with micro-etchings.

In some embodiments, florescent materials may be added to a part, e.g. in recessed areas to provide wavelength outputs which are different from wavelength inputs.

In some embodiments, either prior to detection, or as built into the part, an optical flat may be applied to a part surface and monochromatic light used to provide fringe patterns indicative of the part surface which may be coded with authentication information.

In some embodiments, the unique features described herein can be manufactured with the MICA Freeform process from Microfabrica, Inc. of Van Nuys, Calif., to provide a proprietary and/or sole source method of part identification. In alternative embodiments, LIGA, LASER sintering, silicon wafer process and/or LASER milling processes may be used.

Figure 9:
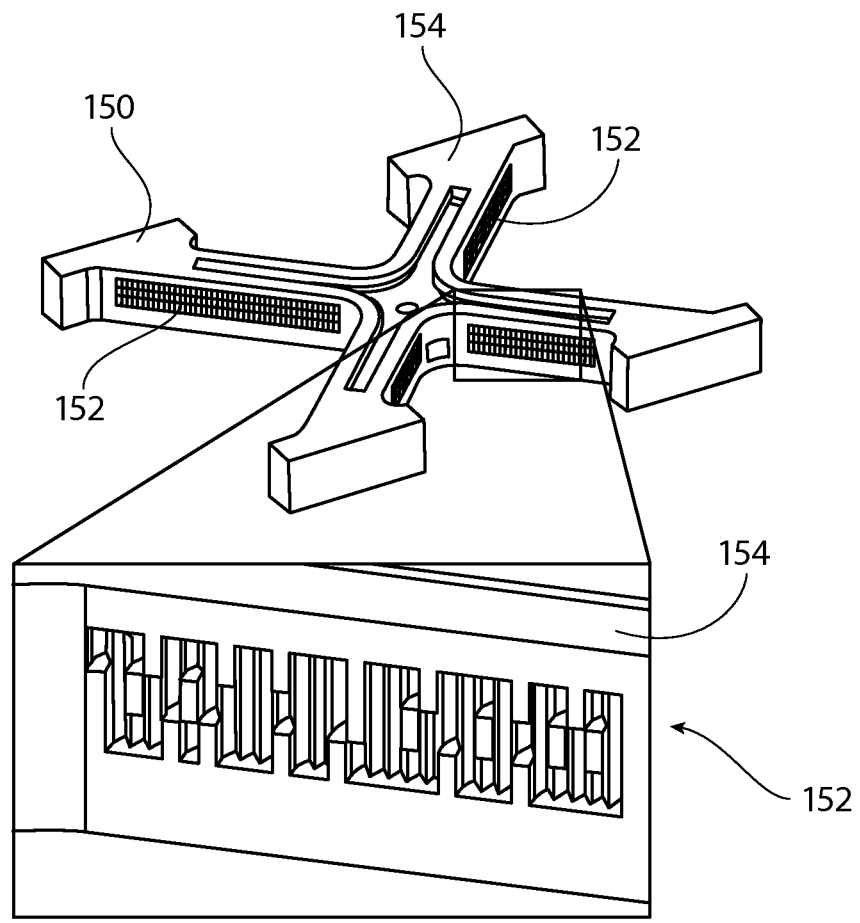
FIG. 9 is a perspective view showing another exemplary anti-counterfeiting structure, and an inset showing an enlarged view of an edge portion of the structure.

Referring to FIGS. 9-17, another implementation of an anti-counterfeiting system is shown. A three-dimensional letter, numeral, symbol, logo or other symbol may be fabricated using an additive process, such as part 150 as shown. Recessed areas 152 may be provided in the vertical side walls to create unique patterns which can be read as a digital or analog code. In this embodiment, eight such areas 152 are provided: two on each leg of the "X". The enlarged inset of FIG. 9 shows an example of a unique pattern that may be used to create a digital code.

Figure 10:
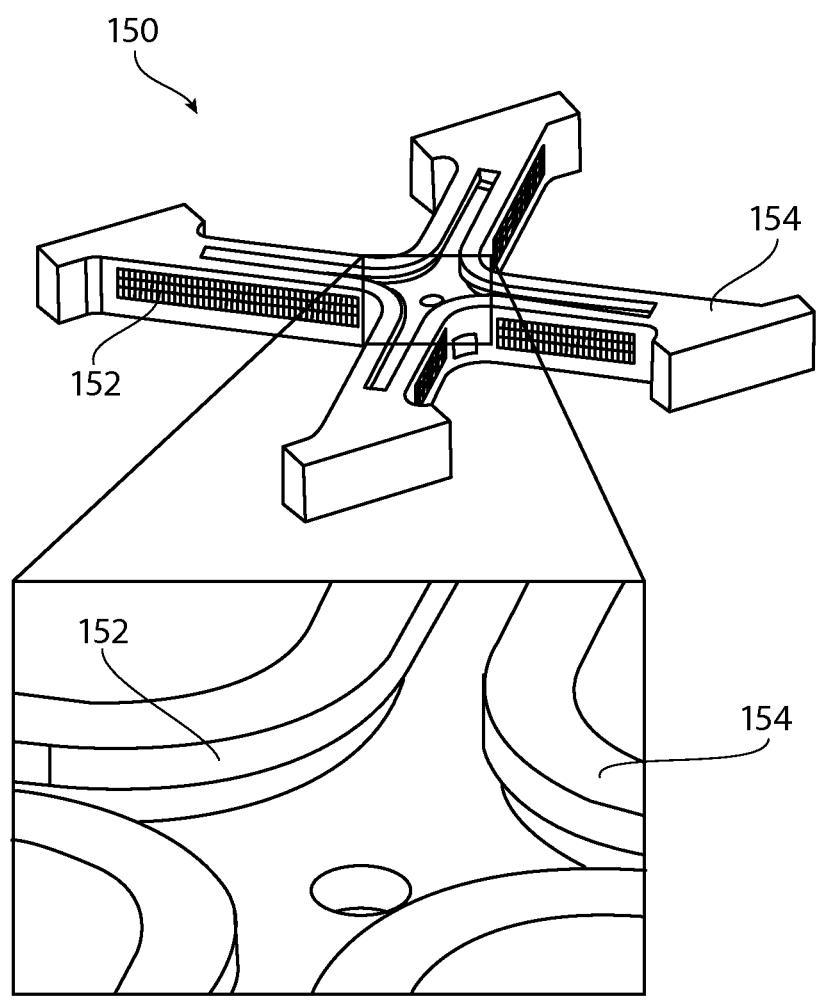
FIG. 10 is a perspective view showing the exemplary anti-counterfeiting structure of FIG. 9, and an inset showing an enlarged view of a center portion of the structure.
Figure 11:
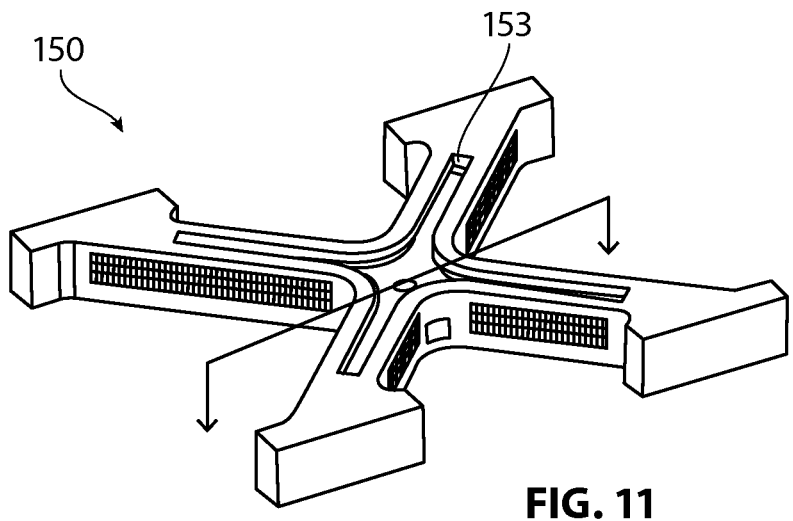
FIG. 11 is a perspective view showing the exemplary anti-counterfeiting structure of FIG. 9.
Figure 12:
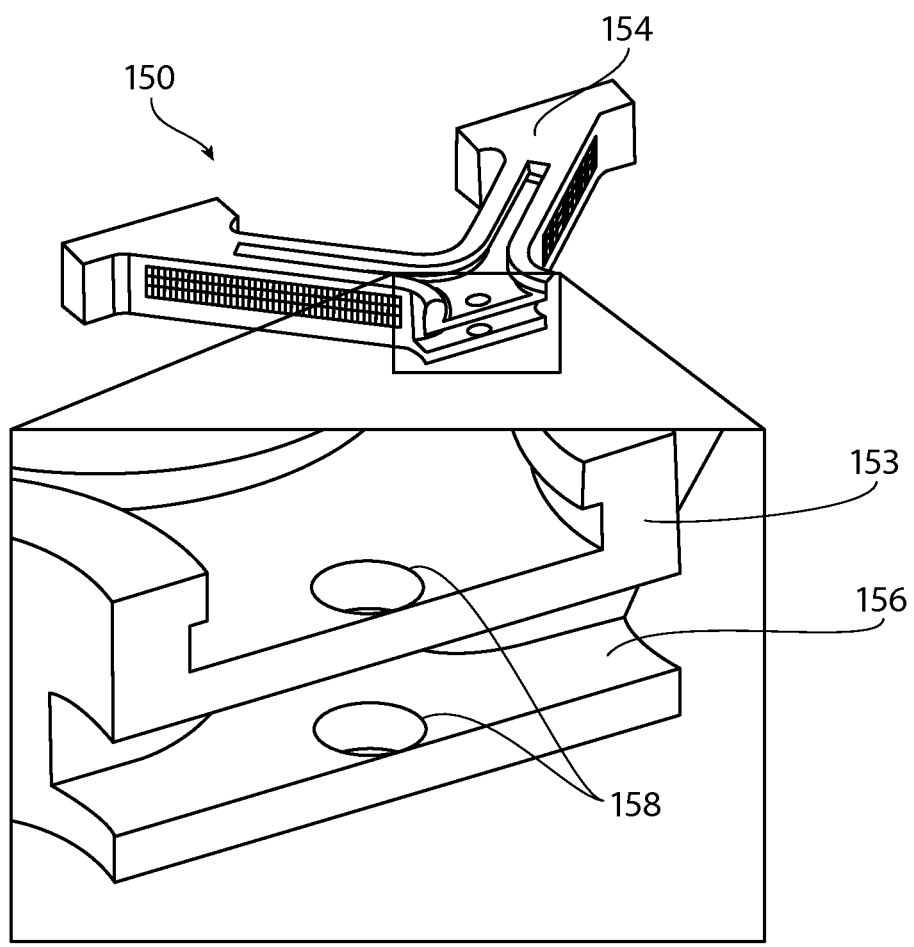
FIG. 12 is a perspective view showing the exemplary anti-counterfeiting structure of FIG. 9, and an inset showing an enlarged view of a cross-section of the center portion of the structure.

As shown in FIGS. 10-12, undercuts 153 in the top surface 154 create unique and proprietary features enabled by the additive process.

Figure 13:
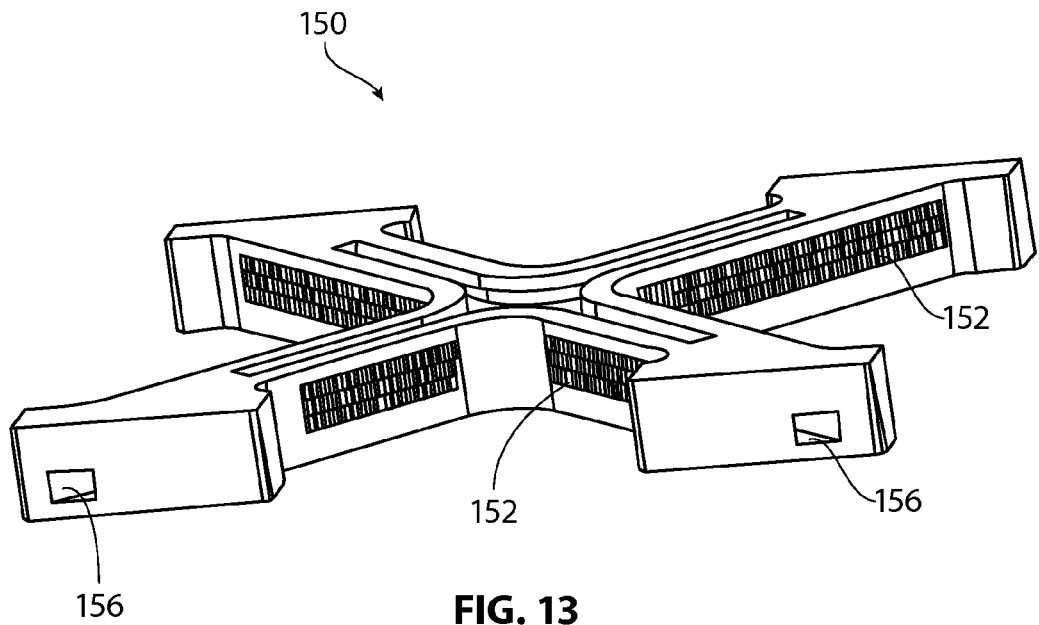
FIG. 13 is a perspective view showing a variation of the exemplary anti-counterfeiting structure of FIG. 9.
Figure 14:
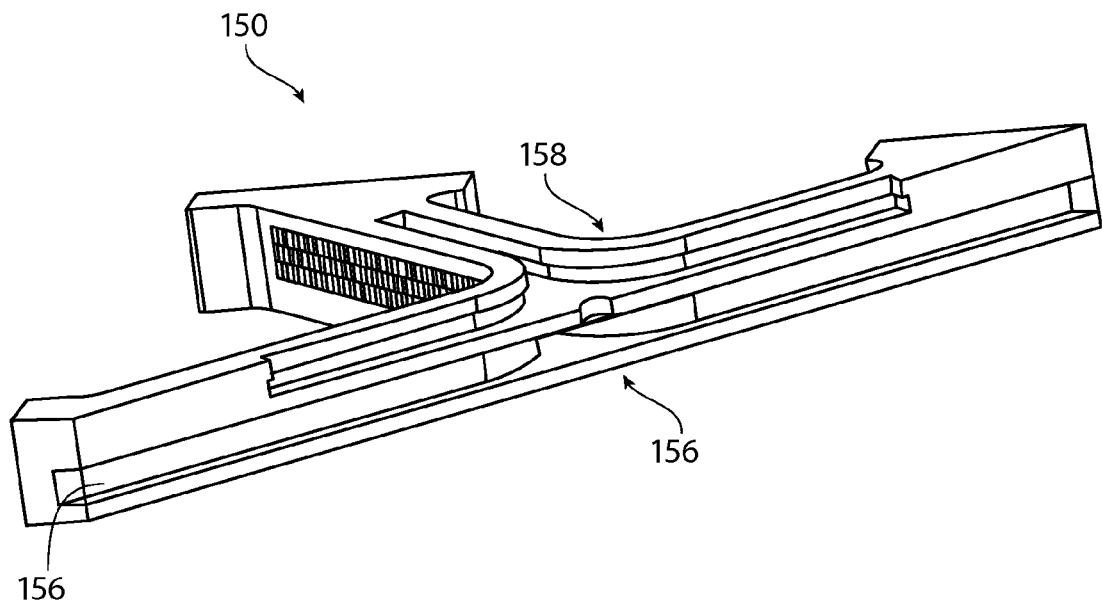
FIG. 14 is a perspective view showing the exemplary anti-counterfeiting structure of FIG. 13 in partial cross-section.

As shown in FIGS. 12-14, internal hollow features 156 may be created for piping light from an entry location 158 in the devices to another location or exiting port(s) for further encoding or deciphering.

Figure 15:
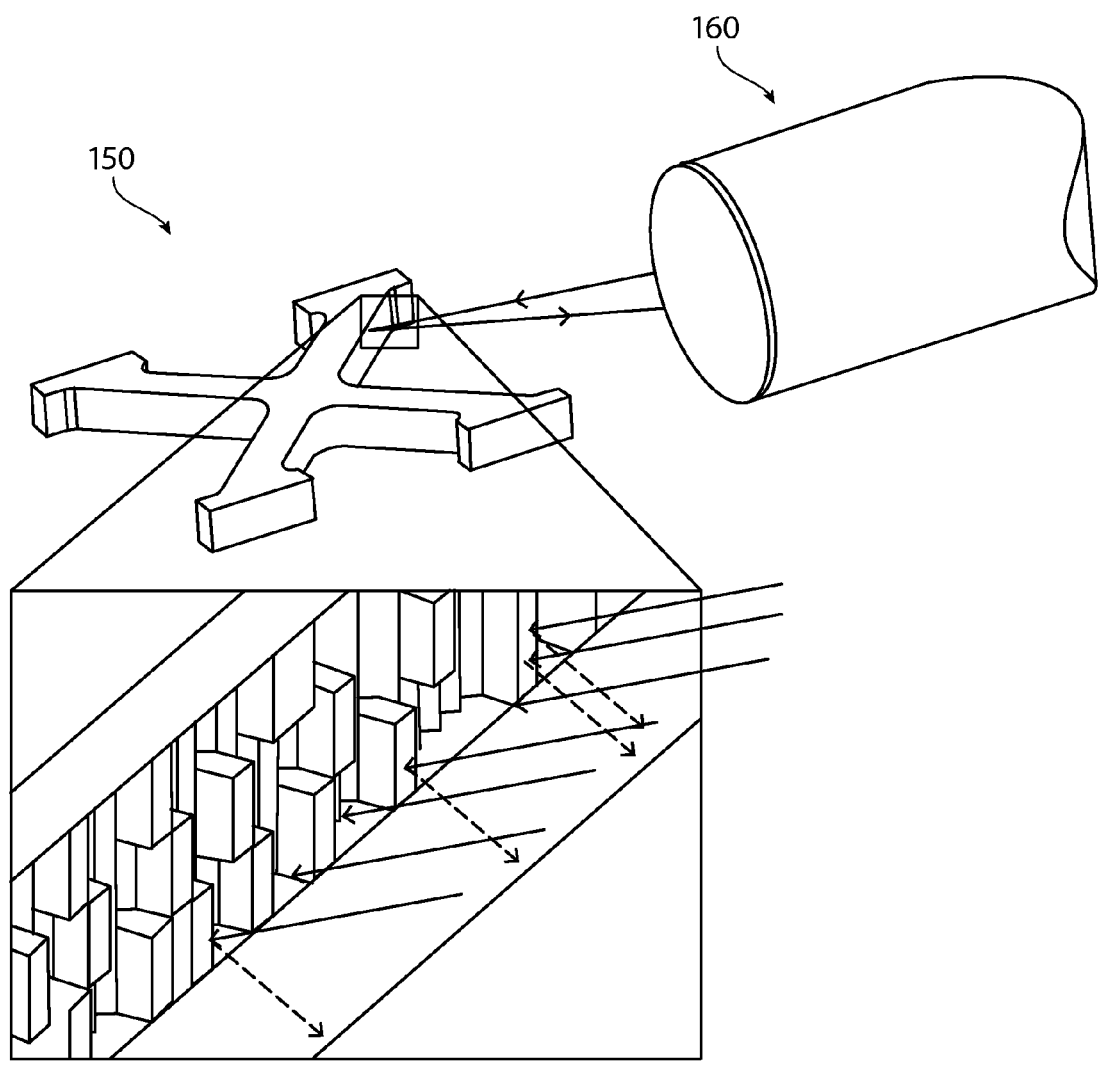
FIG. 15 is a perspective view showing the exemplary anti-counterfeiting structure of FIG. 9 being used in conjunction with a combined light source and detector, and an inset showing an enlarged view of an edge portion of the anti-counterfeiting structure.
Figure 16:
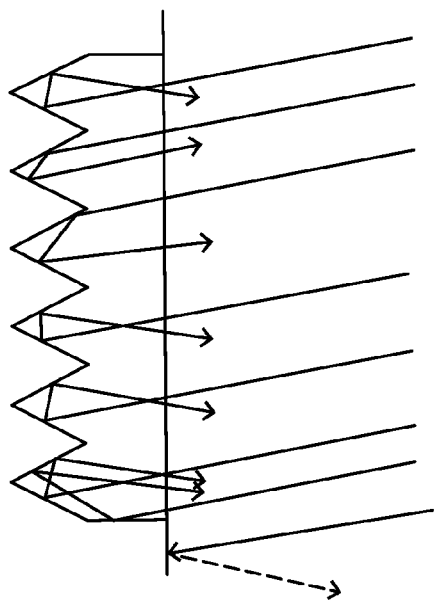
FIG. 16 is an enlarged plan view of an edge portion of the anti-counterfeiting structure of FIG. 9

As shown in FIGS. 15-16, directed light from an emitter/detector (laser or barcode scanner) 160 is focused on the edge of the device 150. The emitted light is reflected off of the surface and returned to the detector 160. The reflected light from the exposed flat surface shows a different intensity (less scattering and therefore higher intensity) from the light reflecting off of the recessed surfaces, which may be rough, textured, non-parallel, and/or a controlled angle of reflection.

Figure 17:
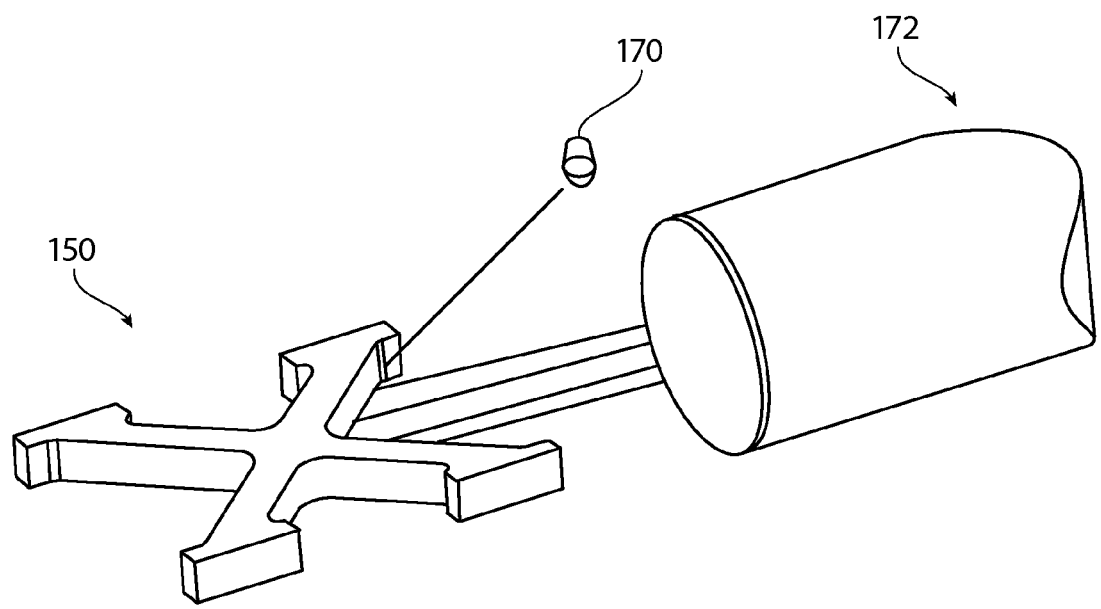
FIG. 17 is a perspective view showing the exemplary anti-counterfeiting structure of FIG. 9 being used in conjunction with a light source and separate detector.

As shown in FIG. 17, the emitter 170 may be separated from the detector or receiver 172. The emitter 170 can be a very simple light source which reflects off of the edges of the part 150. It does not have to be directed light. The detector 172 picks up the reflection. The emitter 170 can be ambient light, UV, infrared or directed light. The detector 172 can be the human eye with optical magnification, image recognition using a camera or image scanner i.e. barcode scanner.

Edges with micro-undercuts having sharp features are unique to layered parts. By controlling the width, height and contrast along the peripheral edge, a unique signature can be deciphered from the reflectance with the use of a directed light and photocell (barcode reader). The edge feature may be an undercut within a layer either below or between two layers. Edge features with undercuts allow for the reflectance of or scattering/passage of light. As previously mentioned, the edge features can be used to represent unique patterns, such as Random, Checkerboard, Chevrons, Stair step, Barcode, Morse Code, Binary, and Custom.

Figure 18:
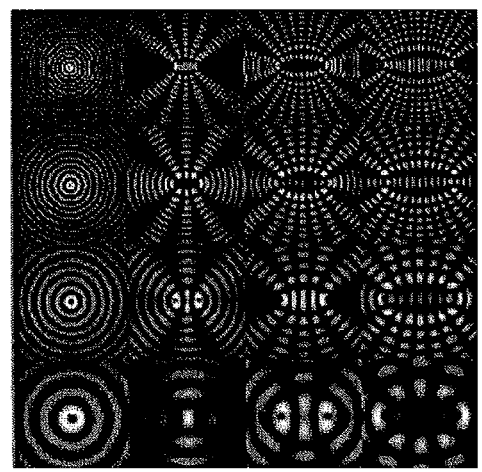
FIG. 18 is a plan view showing exemplary optical interference patterns that may be created by embodiments of the disclosure.

Edge features can be internal to the layers or more central to the interior of the part. They can act as a conduit for light which allows the light to enter and reemerge through an opening which is either straight cut or set with a ledge forming an undercut. Adding to the complexity of the overall light path from input to output creates unique micro optical systems which in some implementations can only be produced with the proprietary MICA Freeform process provided by Microfabrica, Inc. Edge features can direct light to upper or lower layers where the output is converted to a unique pattern or code. When light enters and passes through upper or lower layers of the part, the exiting light creates unique light patterns either by single path or multiple paths for phase shifting (bars, fringe patterns, shapes, etc. . . . ) after interacting with the edges of structure or opposing layers. Examples of possible interference patterns 174 using this technique are shown in FIG. 18.

Figure 19:
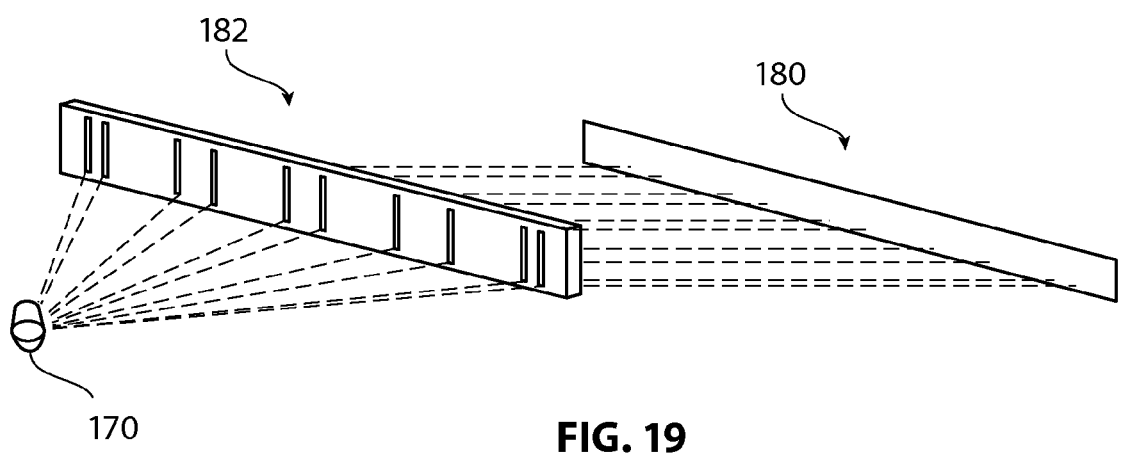
FIG. 19 is a perspective view showing another exemplary anti-counterfeiting system constructed according to aspects of the disclosure.

Referring to FIG. 19, an array of interference patterns 180 can be created by combining together a unique set of slits 182. The interference pattern 180 can be used as a micro barcode. By building the gaps or slits layer by layer, micro-meter or nano-meter gaps can be achieved. The width of the slit can be adjusted depending on the source of the electromagnetic wave. It can be as small as 400 nm for visible light or 1064 nm for a Nd:YAG laser. The slits can be created by using the additive layerized manufacturing process. By inter-digitating the layers as shown in FIG. 20, slits can be made with openings in the nanometer range. The middle layer between two layers can be made into a slide thus allowing the gap of slit to be adjusted, as shown in FIGS. 21A-21B. By combining different widths between slits, a unique interference pattern can be created as a signature.

Figure 22:
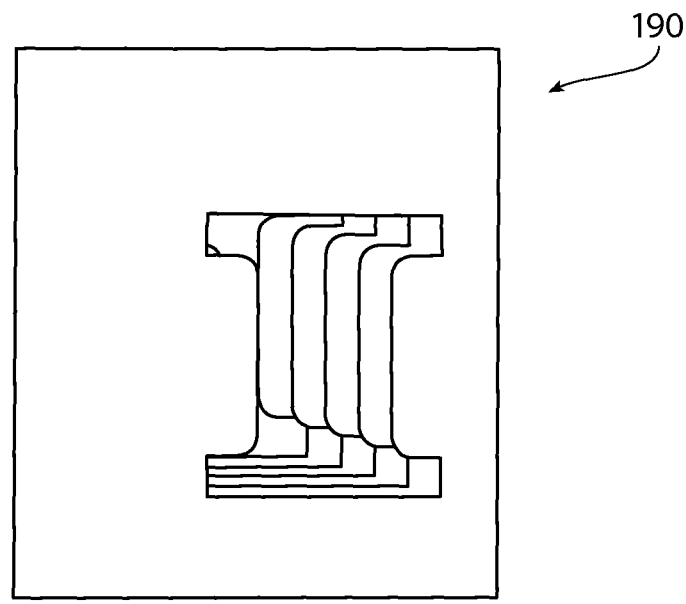
FIG. 22 is a side view showing another exemplary anti-counterfeiting device.
Figure 23:
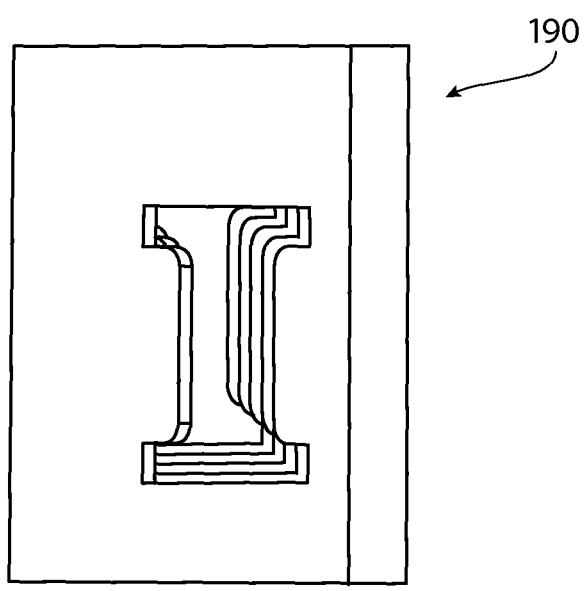
FIG. 23 is a side view showing the device of FIG. 22 after being rotated.
Figure 27:
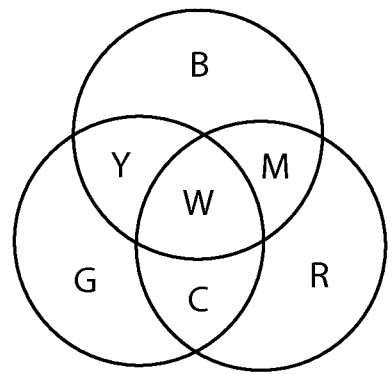
FIG. 27 is a plan view schematically showing the effects of combining various colors.
Figure 28:
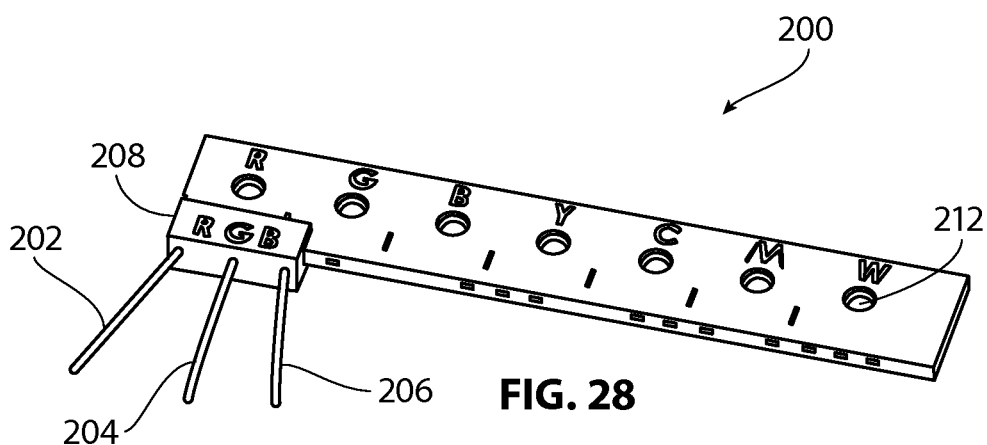
FIG. 28 is a perspective view showing another exemplary anti-counterfeiting system.
Figure 29:
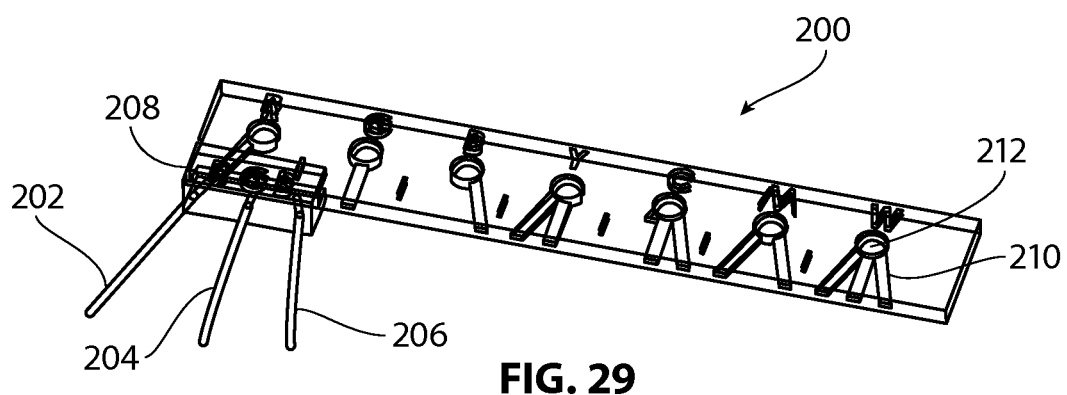
FIG. 29 is a perspective view showing a transparent version of the system of FIG. 28 for clarity of understanding.
Figure 30:
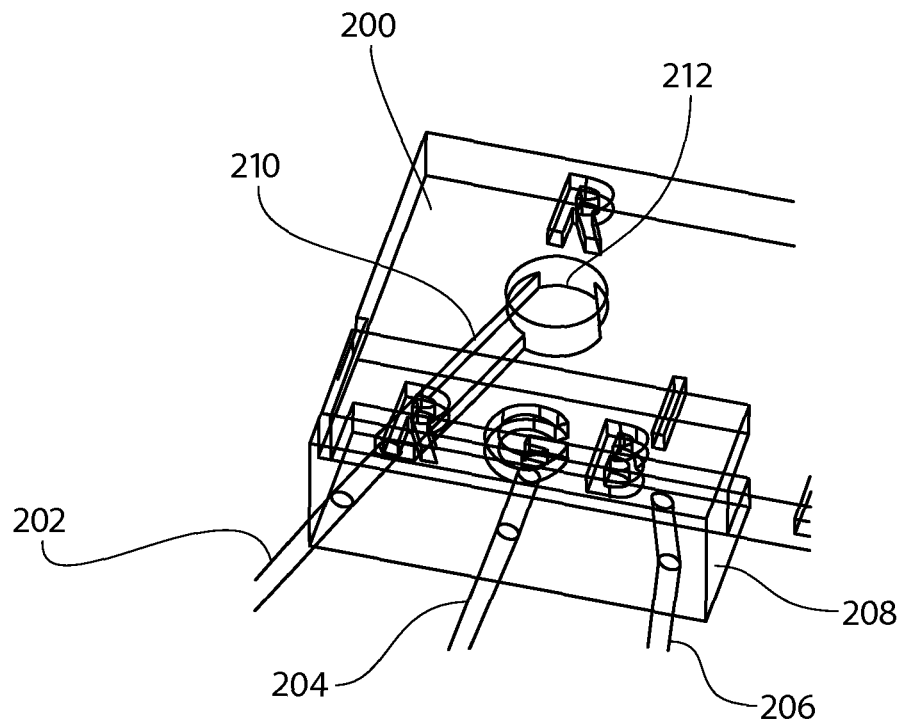
FIG. 30 is an enlarged perspective view showing a portion of the system of FIG. 29

Referring to FIGS. 22-26, another implementation of an anti-counterfeiting system is shown using angled filters. With this approach, projected images can only be seen in certain angles and at least partially blocked at all other angles. For example, FIG. 22 shows a plan view of an example of an angle filter 190 fabricated using a layered, additive process. FIG. 23 shows the same angle filter 190 rotated 45 degrees about a vertical Y axis. In FIG. 24, the letter I is shown after the filter 190 is rotated 45 degrees about the Y axis and 30 degrees about the X axis. In FIG. 25, filter 190 has been rotated 45 degrees about the Y axis, 30 degrees about the X axis, and 20 degrees about the Z axis to bring the letter I into sharp focus. Each anti-counterfeiting device can have a unique set of pre-determined rotations or viewing angles in which one or more symbols come into focus to indicate the part is genuine. Depending on the implementation, the part and/or an optical detector can be manually or automatically rotated.

Referring to FIGS. 24-27, another implementation of an anti-counterfeiting system is shown which utilizes a combination of different colors of light: In this exemplary embodiment, the three colors red, green and blue enter the device 200 from side channels to create either yellow, cyan, magenta, or white color. The final color can be seen from the window on the top. By selectively combining the three colors red, green and blue as inputs, the output colors can be wide range of colors. For example, the colors red, green and blue can each be provided by a separate fiber optic cable 202, 204 and 206, respectively, into slidable input block 208. Block 208 may be slid along device 200 to seven different stations in turn. Each station has a different arrangement of internal optical channels 210 which interconnect block 208 with an output aperture 212 associated with that station. Block 208 may be slid along device 200 and the color of light emitted from each aperture 212 observed. Only authentic parts 200 having the proper internal optical channels 210 will produce the correct output colors, which may be read with an optical detector or the human eye, depending on the implementation.

In some embodiments, interrogating patterns may be used to authenticate parts. For illuminated patterns, light can be piped into channels and exiting light patterns can be confirmed with a photo array. For non-illuminated patterns, a microscope may be used to compare surface patterns with known pattern for a go-no-go method. A bar code reader or laser reflective scanner can be used to read patterns and convert information to data. A vision system with pattern recognition can be used for an automated approach to deciphering the reflection from complex patterns.

In other embodiments involving methods for altering signal response, light patterns can be altered via magnet or electromagnetic force. For example, a Reed switch, Toggle, Slide, and/or Hinge may be used. In some embodiments, passive and/or active components can be imbedded in a structure for activating or reading signals from light, EM field, voltage, current, air pressure, etc. Pattern or surface texture with micro-etching may be used. Buried features may be used where visualizing is done with X-Ray. The name of a company, a serial number or other code may be formed underneath a layer of metals. The "buried" marking can be recessed, hollow or made of a different metal. Florescent material may be added to the structure, via ports or recessed areas, or these features areas may be filled with platinum or palladium. A flat optical surface may be applied to a flat plane and monochromatic light shone on the surface. By inspecting patterns created by non-planar surfaces, fringes will show high areas. In some embodiments, special surfaces may be created by a mechanical process. For example, single point tooling can be used to create unique patterns that can be varied by feed rate.

In some embodiments, a product ID may be imbedded with MICA Freeform technology. A fresnel parabolic lens may also be created to uniquely identify products.

Figure 31:
FIG. 31 is a top view showing another exemplary anti-counterfeiting device.
Figure 32:
FIG. 32 is a side view showing the device of FIG. 31.
Figure 33:
FIG. 33 is a bottom view showing the device of FIG. 31.
Figure 34:
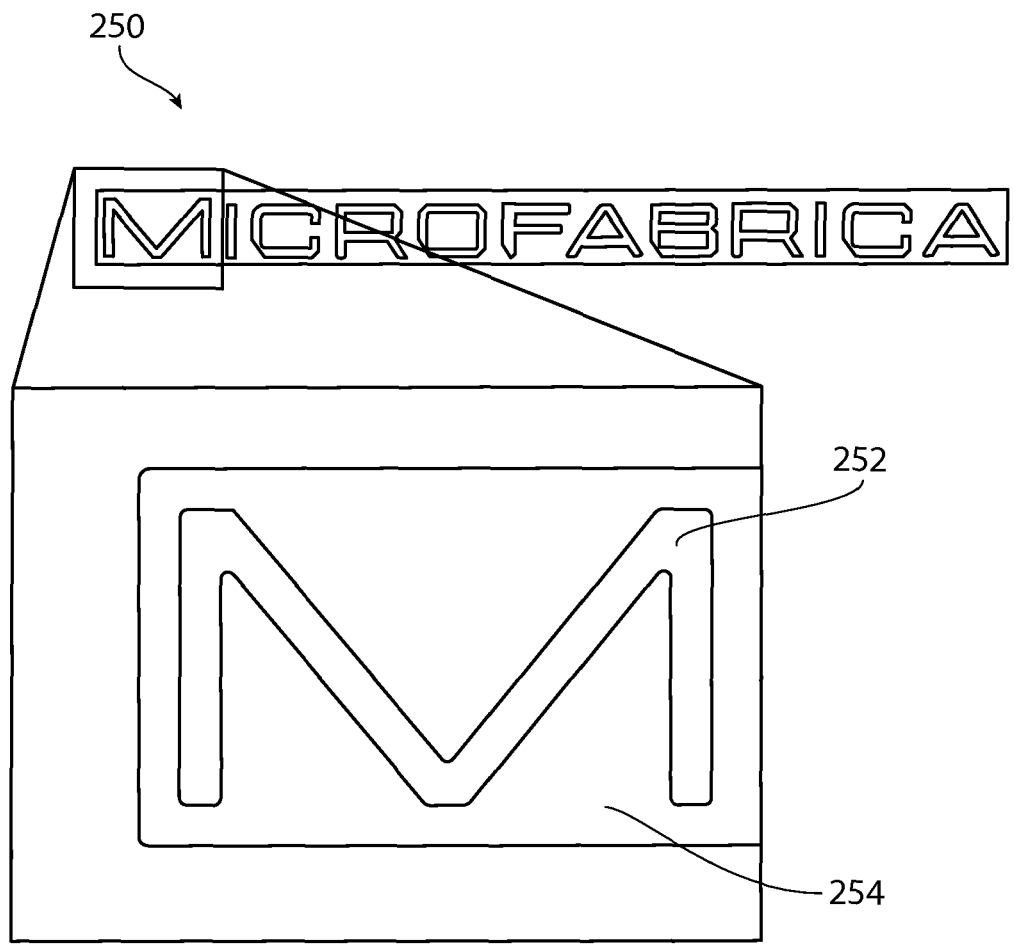
FIG. 34 is a top view showing the device of FIG. 31, with an inset showing an enlarged portion of the device.
Figure 35:
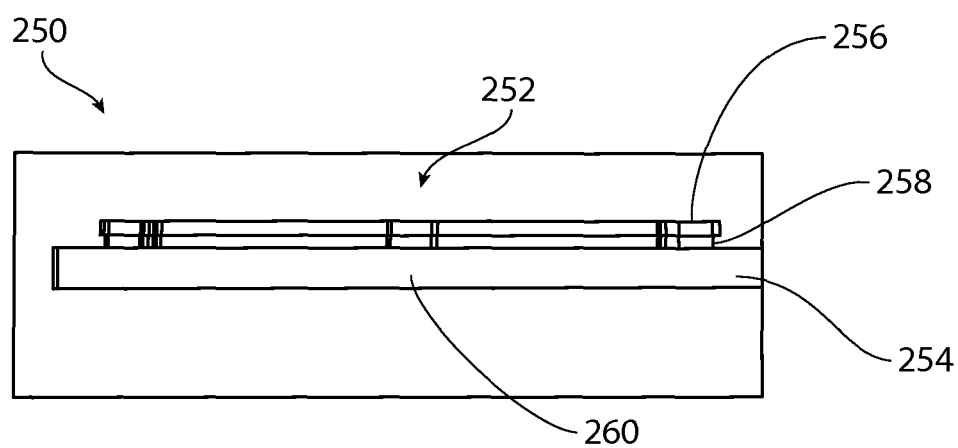
FIG. 35 is a side cross-sectional view of the portion of the device shown in the inset of FIG. 34.
Figure 36:
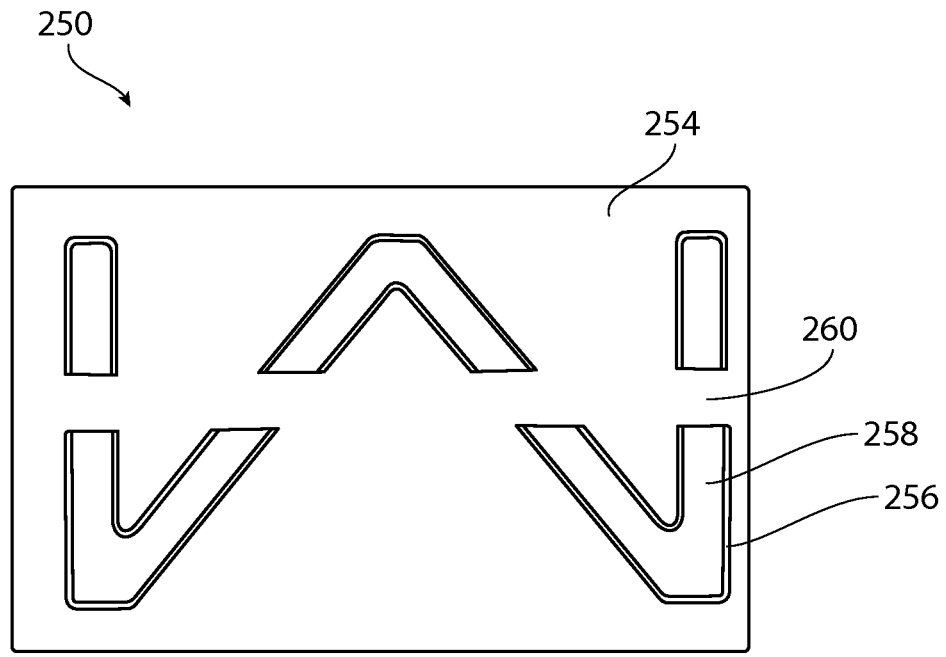
FIG. 36 is a bottom view of the portion of the device shown in the inset of FIG. 34.
Figure 37:
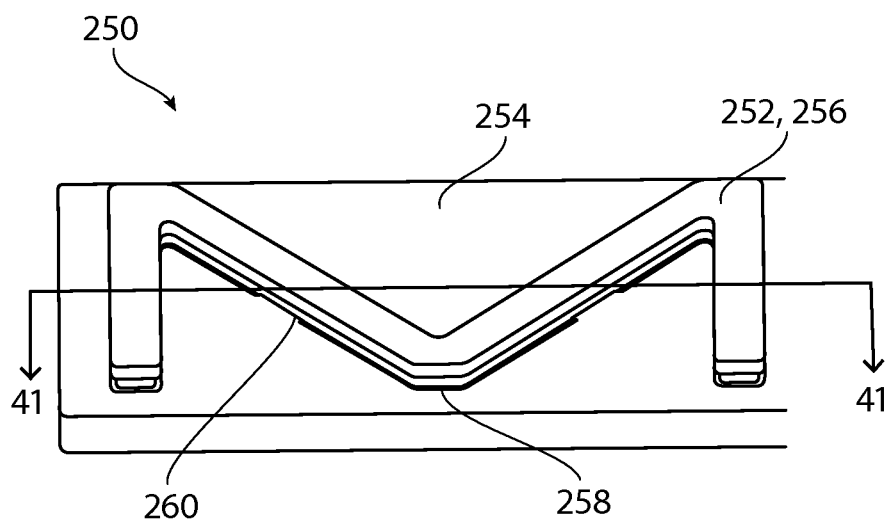
FIG. 37 is an oblique view of the portion of the device shown in the inset of FIG. 34.
Figure 38:
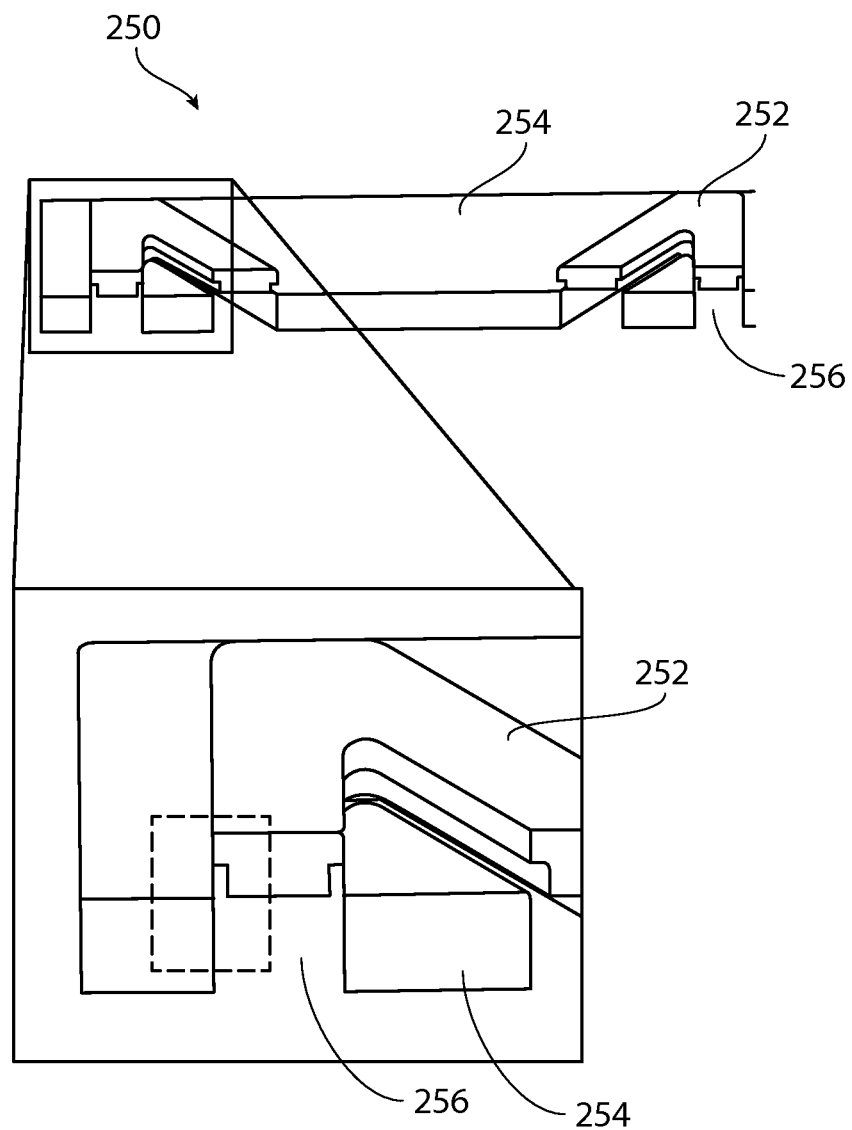
FIG. 38 is a cross-sectional view of the portion of the device shown in FIG. 37, with an inset showing an enlarged portion of the cross-section.

Referring to FIGS. 31-42, another implementation of an anti-counterfeiting and/or decorative system is shown which utilizes backlighting of a logo or other feature. FIGS. 31, 32 and 33 show top, side and bottom views of an exemplary logo, respectively. FIGS. 34, 35 and 36 show top, side and bottom views, respectively, of an enlarged portion of the exemplary logo of FIGS. 34-36. FIG. 37 shows an angled view of the logo portion shown in FIG. 34, and FIG. 38 shows the cross-section depicted by Arrow 41-41 in FIG. 37. FIGS. 39-42 show various cross-sectional views similar to FIG. 38.

As best seen in FIG. 31, device 250 includes a company logo in the form of letters 252. As shown in the side view of FIG. 32, letters 252 are formed in a raised manner above a substrate 254. As shown in the bottom view of FIG. 33, substrate 254 includes slits 256 to allow light to travel through substrate 254, as will be more fully described below.

Referring to the side cross-sectional view of FIG. 35, device 250 is formed from at least three distinct layers: a raised layer 256, an intermediate layer 258, and a substrate layer 254. In some embodiments, each of these three layers can be formed as a single, separate layer using an additive process, with each layer having a thickness of 100 microns or less. In other embodiments, each of these three "layers" can be formed from multiple sub-layers. Each sub-layer may be less than 100 microns thick, but the overall built up layer 256, 258 and/or 254 may be thicker than 100 microns. As used herein, the term "layer" may refer to either type of construction, depending on the context.

Figure 39:
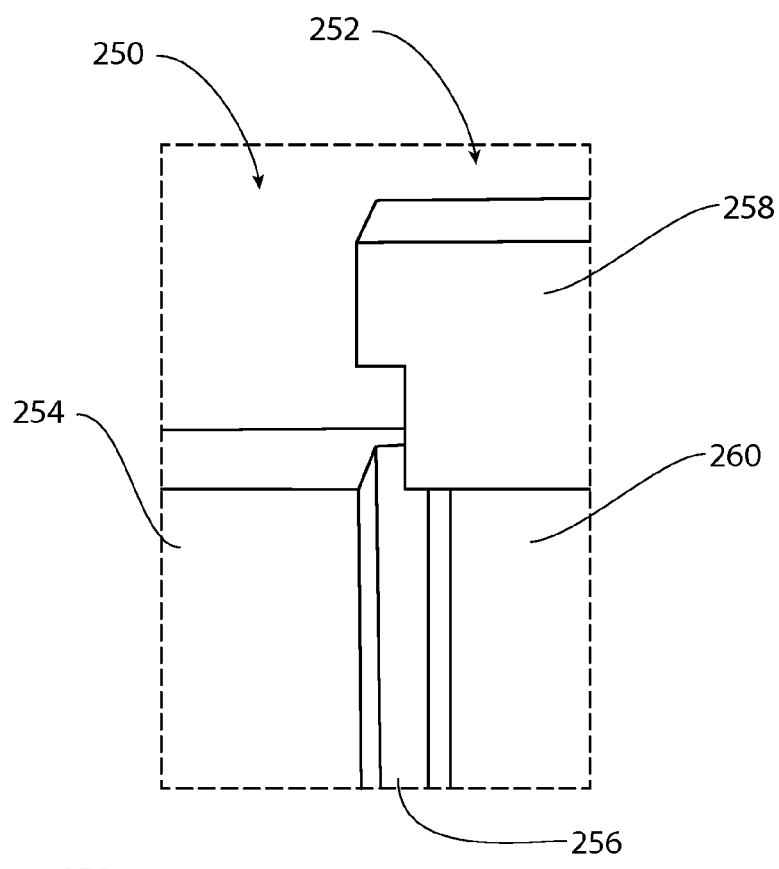
FIG. 39 is a cross-sectional view showing a portion of the device as indicated in FIG. 38
Figure 40:
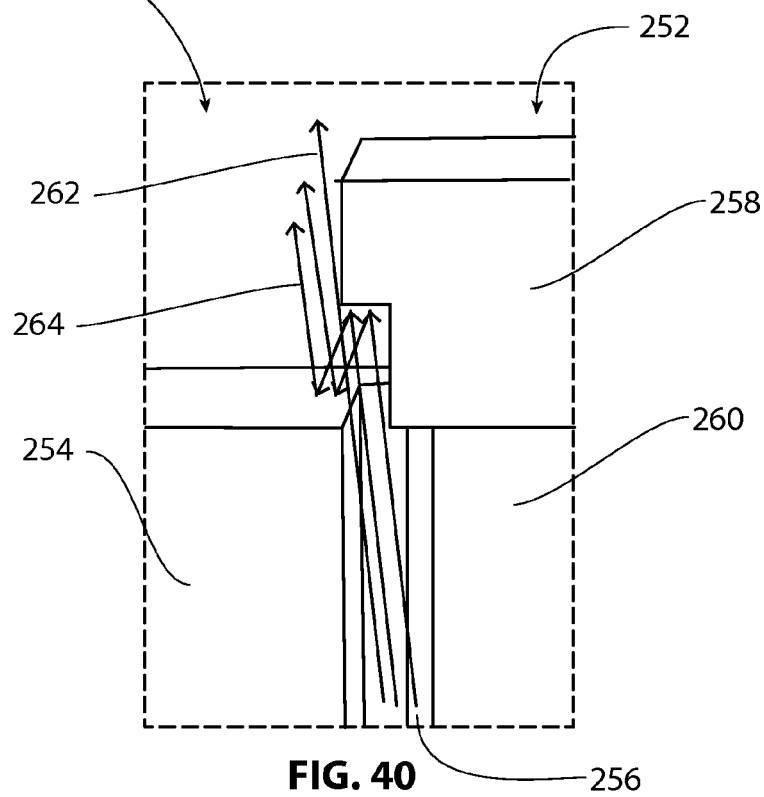
FIG. 40 is a cross-sectional view similar to FIG. 39 with light paths added.

As shown in FIG. 36, substrate layer 254 may include bridge portions 260 which support intermediate layer 258 and raised layer 256 in a cantilevered fashion over slits 256. Note that slits 256 are not seen in FIG. 35 because the cross-section of that figure is taken through the bridge portions 260. As best seen in FIG. 38, letters 252 are suspended over substrate 254 such that light coming from beneath device 250 can pass through slits 256 in the substrate layer 254 and emerge from around the edges of the letters 252. FIG. 39 shows an enlarged portion of an edge of a letter 252, and FIG. 40 shows exemplary light paths 262 and 264.

Figure 41:
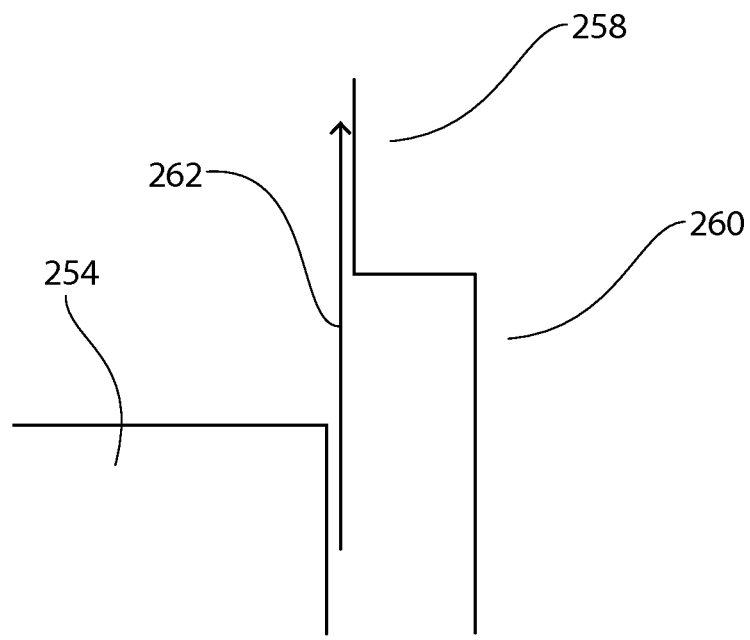
FIG. 41 is a cross-sectional view similar to FIG. 40 showing a direct lighting configuration.
Figure 42:
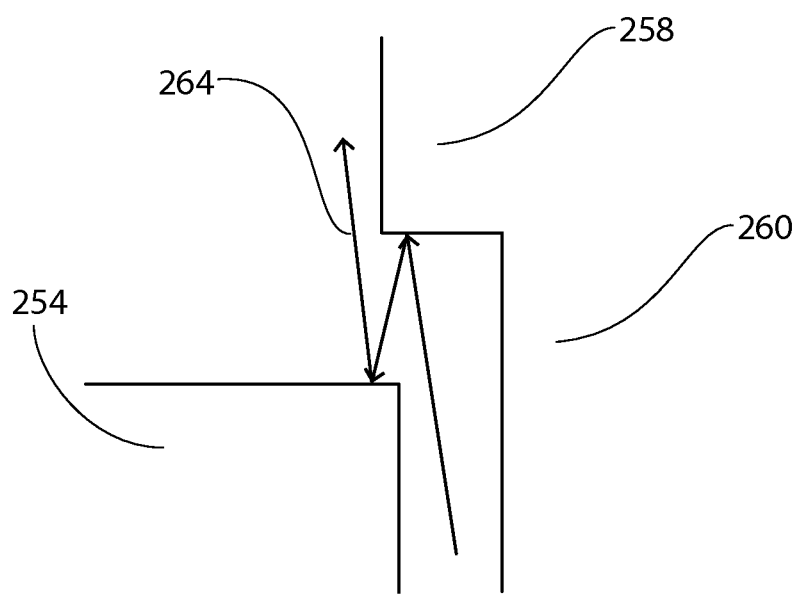
FIG. 42 is a cross-sectional view similar to FIG. 40 showing an indirect lighting configuration.

In some embodiments, backlighting can be created by the unique additive process of MICA Freeform, such as providing directed or scattered back lighting. With the gap between the edge of the raised layer 256 and the edge of the slit 256 being 2 um or wider, the light path 262 is opened directly from the backlighting to the front, as depicted in FIG. 41. The direct and high intensity light 262 is shown around the edges of the logo. With the structure overlapped 2 um or more, the light path 264 is formed indirectly from the backlighting to the front, as depicted in FIG. 42. The scattered light 264 is shown on the edges of the logo with lower intensity since it is scattered before traveling to and beyond the logo edges.

Figure 43:
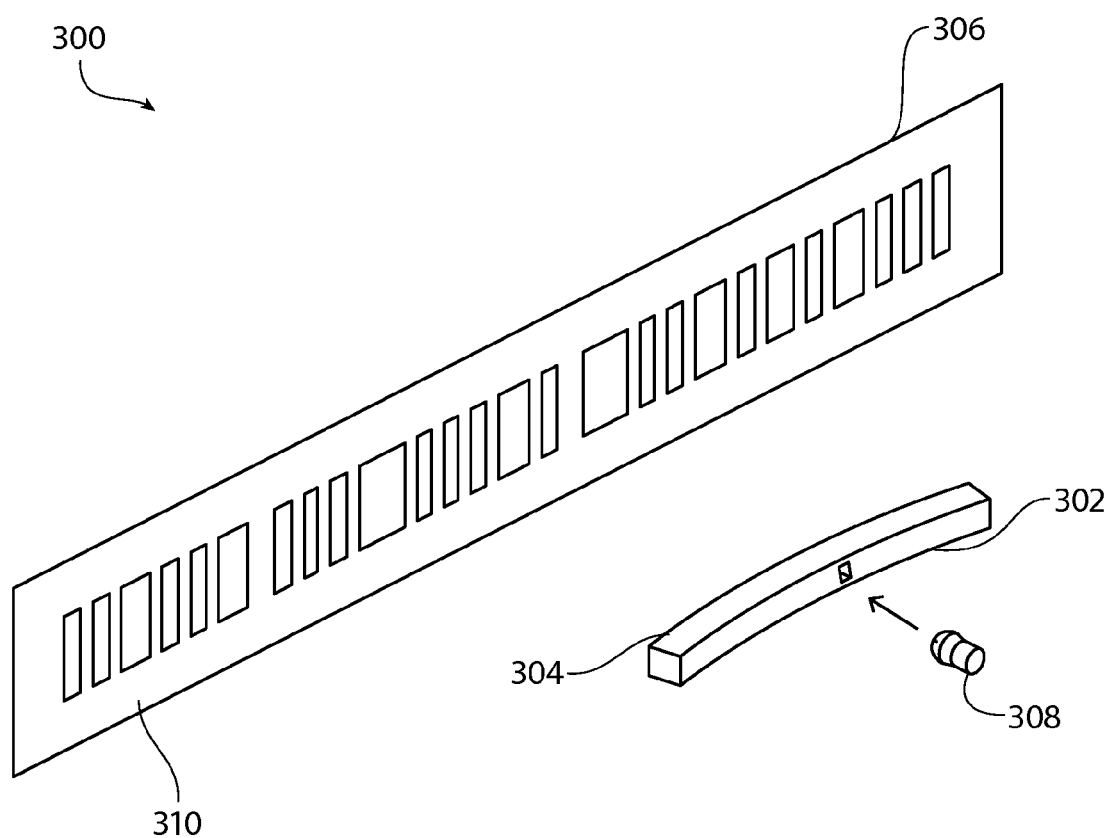
FIG. 43 is a perspective view showing another exemplary anti-counterfeiting system constructed according to aspects of the disclosure.

Referring to FIG. 43, another implementation of an anti-counterfeiting system 300 is shown which utilizes backlighting to magnify a barcode. In this exemplary embodiment, the barcode 302 is imbedded in a curved MEMS device 304 having a scale of microns. The barcode 302 can be magnified by projecting onto a surface 306 using backlighting 308. A barcode reader (not shown) with less resolution than would be needed to read the barcode 302 directly can be used to read the projected code 310 from the surface 306.

Further Comments and Conclusions

Extended hollow channels and hollow but sealed passages may be formed using the teachings set forth in U.S. Pat. No. 8,262,916, entitled "Enhanced Methods for at least Partial In Situ Release of Sacrificial Material from Cavities or Channels and/or Sealing of Etching Holes During Fabrication of Multi-Layer Microscale or Millimeter-scale Complex Three-Dimensional Structures".

Structural or sacrificial dielectric materials may be incorporated into embodiments of the present disclosure in a variety of different ways. Such materials may form a third material or higher deposited on selected layers or may form one of the first two materials deposited on some layers. Additional teachings concerning the formation of structures on dielectric substrates and/or the formation of structures that incorporate dielectric materials into the formation process and possibility into the final structures as formed are set forth in a number of patent applications filed Dec. 31, 2003. The first of these filings is U.S. Patent Application No. 60/534,184 which is entitled "Electrochemical Fabrication Methods Incorporating Dielectric Materials and/or Using Dielectric Substrates". The second of these filings is U.S. Patent Application No. 60/533,932, which is entitled "Electrochemical Fabrication Methods Using Dielectric Substrates". The third of these filings is U.S. Patent Application No. 60/534,157, which is entitled "Electrochemical Fabrication Methods Incorporating Dielectric Materials". The fourth of these filings is U.S. Patent Application No. 60/533,891, which is entitled "Methods for Electrochemically Fabricating Structures Incorporating Dielectric Sheets and/or Seed layers That Are Partially Removed Via Planarization". A fifth such filing is U.S. Patent Application No. 60/533,895, which is entitled "Electrochemical Fabrication Method for Producing Multi-layer Three-Dimensional Structures on a Porous Dielectric". Additional patent filings that provide teachings concerning incorporation of dielectrics into the EFAB process include U.S. patent application Ser. No. 11/139,262, filed May 26, 2005, now U.S. Pat. No. 7,501,328, by Lockard, et al., and which is entitled "Methods for Electrochemically Fabricating Structures Using Adhered Masks, Incorporating Dielectric Sheets, and/or Seed Layers that are Partially Removed Via Planarization"; and U.S. patent application Ser. No. 11/029,216, filed Jan. 3, 2005 by Cohen, et al., now abandoned, and which is entitled "Electrochemical Fabrication Methods Incorporating Dielectric Materials and/or Using Dielectric Substrates". These patent filings are each hereby incorporated herein by reference as if set forth in full herein.

Some embodiments may employ diffusion bonding or the like to enhance adhesion between successive layers of material. Various teachings concerning the use of diffusion bonding in electrochemical fabrication processes are set forth in U.S. patent application Ser. No. 10/841,384 which was filed May 7, 2004 by Cohen et al., now abandoned, which is entitled "Method of Electrochemically Fabricating Multi-layer Structures Having Improved Interlayer Adhesion" and which is hereby incorporated herein by reference as if set forth in full. This application is hereby incorporated herein by reference as if set forth in full.

Though the embodiments explicitly set forth herein have considered multi-material layers to be formed one after another. In some embodiments, it is possible to form structures on a layer-by-layer basis but to deviate from a strict planar layer on planar layer build up process in favor of a process that interlaces material between the layers. Such alternative build processes are disclosed in U.S. application Ser. No. 10/434,519, filed on May 7, 2003, now U.S. Pat. No. 7,252,861, entitled Methods of and Apparatus for Electrochemically Fabricating Structures Via Interlaced Layers or Via Selective Etching and Filling of Voids. The techniques disclosed in this referenced application may be combined with the techniques and alternatives set forth explicitly herein to derive additional alternative embodiments. In particular, the structural features are still defined on a planar-layer-by-planar-layer basis but material associated with some layers are formed along with material for other layers such that interlacing of deposited material occurs. Such interlacing may lead to reduced structural distortion during formation or improved interlayer adhesion. This patent application is herein incorporated by reference as if set forth in full.

The patent applications and patents set forth below are hereby incorporated by reference herein as if set forth in full. The teachings in these incorporated applications can be combined with the teachings of the instant application in many ways: For example, enhanced methods of producing structures may be derived from some combinations of teachings, enhanced structures may be obtainable, enhanced apparatus may be derived, and the like.

| U.S. patent application No., Filing Date U.S. application Pub No., Pub Date U.S. Pat. No., Pub Date | Inventor, Title |
|---|---|
| 09/493,496 - Jan. 28, 2000 U.S. Pat. No. 6,790,377 - Sep. 14, 2004 | Cohen, "Method For Electrochemical Fabrication" |
| 10/677,556 - Oct. 1, 2003 2004-0134772 - Jul. 15, 2004 | Cohen, "Monolithic Structures Including Alignment and/or Retention Fixtures for Accepting Components" |
| 10/830,262 - Apr. 21, 2004 2004-0251142A - Dec. 16, 2004 U.S. Pat. No. 7,198,704 - Apr. 3, 2007 | Cohen, "Methods of Reducing Interlayer Discontinuities in Electrochemically Fabricated Three-Dimensional Structures" |
| 10/271,574 - Oct. 15, 2002 2003-0127336A - Jul. 10, 2003 U.S. Pat. No. 7,288,178 - Oct. 30, 2007 | Cohen, "Methods of and Apparatus for Making High Aspect Ratio Microelectromechanical Structures" |
| 10/697,597 - Dec. 20, 2002 2004-0146650A - Jul. 29, 2004 | Lockard, "EFAB Methods and Apparatus Including Spray Metal or Powder Coating Processes" |
| 10/677,498 - Oct. 1, 2003 2004-0134788 - Jul. 15, 2004 U.S. Pat. No. 7,235,166 - Jun. 26, 2007 | Cohen, "Multi-cell Masks and Methods and Apparatus for Using Such Masks To Form Three-Dimensional Structures" |
| 10/724,513 - Nov. 26, 2003 2004-0147124 - Jul. 29, 2004 U.S. Pat. No. 7,368,044 - May 6, 2008 | Cohen, "Non-Conformable Masks and Methods and Apparatus for Forming Three-Dimensional Structures" |
| 10/607,931 - Jun. 27, 2003 2004-0140862 - Jul. 22, 2004 U.S. Pat. No. 7,239,219 - Jul. 3, 2007 | Brown, "Miniature RF and Microwave Components and Methods for Fabricating Such Components" |
| 10/841,100 - May 7, 2004 2005-0032362 - Feb. 10, 2005 U.S. Pat. No. 7,109,118 - Sep. 19, 2006 | Cohen, "Electrochemical Fabrication Methods Including Use of Surface Treatments to Reduce Overplating and/or Planarization During Formation of Multi-layer Three-Dimensional Structures" |
| 10/387,958 - Mar. 13, 2003 2003-022168A - Dec. 4, 2003 | Cohen, "Electrochemical Fabrication Method and Application for Producing Three-Dimensional Structures Having Improved Surface Finish" |
| 10/434,494 - May 7, 2003 2004-0000489A - Jan. 1, 2004 | Zhang, "Methods and Apparatus for Monitoring Deposition Quality During Conformable Contact Mask Plating Operations" |
| 10/434,289 - May 7, 2003 20040065555A - Apr. 8, 2004 | Zhang, "Conformable Contact Masking Methods and Apparatus Utilizing In Situ Cathodic Activation of a Substrate" |
| 10/434,294 - May 7, 2003 2004-0065550A - Apr. 8, 2004 | Zhang, "Electrochemical Fabrication Methods With Enhanced Post Deposition Processing" |
| 10/434,295 - May 7, 2003 2004-0004001A - Jan. 8, 2004 | Cohen, "Method of and Apparatus for Forming Three-Dimensional Structures Integral With Semiconductor Based Circuitry" |
| 10/434,315 - May 7, 2003 2003-0234179 A - Dec. 25, 2003 U.S. Pat. No. 7,229,542 - Jun. 12, 2007 | Bang, "Methods of and Apparatus for Molding Structures Using Sacrificial Metal Patterns" |
| 10/434,103 - May 7, 2004 2004-0020782A - Feb. 5, 2004 U.S. Pat. No. 7,160,429 - Jan. 9, 2007 | Cohen, "Electrochemically Fabricated Hermetically Sealed Microstructures and Methods of and Apparatus for Producing Such Structures" |
| 10/841,006 - May 7, 2004 2005-0067292 - May 31, 2005 | Thompson, "Electrochemically Fabricated Structures Having Dielectric or Active Bases and Methods of and Apparatus for Producing Such Structures" |

-continued

| U.S. patent application No., Filing Date U.S. application Pub No., Pub Date U.S. Pat. No., Pub Date | Inventor, Title |
|---|---|
| 10/434,519 - May 7, 2003 2004-0007470A - Jan. 15, 2004 U.S. Pat. No. 7,252,861 - Aug. 7, 2007 | Smalley, "Methods of and Apparatus for Electrochemically Fabricating Structures Via Interlaced Layers or Via Selective Etching and Filling of Voids" |
| 10/724,515 - Nov. 26, 2003 2004-0182716 - Sep. 23, 2004 U.S. Pat. No. 7,291,254 - Nov. 6, 2007 | Cohen, "Method for Electrochemically Forming Structures Including Non-Parallel Mating of Contact Masks and Substrates" |
| 10/841,347 - May 7, 2004 2005-0072681 - Apr. 7, 2005 | Cohen, "Multi-step Release Method for Electrochemically Fabricated Structures" |
| 60/533,947 - Dec. 31, 2003 | Kumar, "Probe Arrays and Method for Making" |
| 60/534,183 - Dec. 31, 2003 | Cohen, "Method and Apparatus for Maintaining Parallelism of Layers and/or Achieving Desired Thicknesses of Layers During the Electrochemical Fabrication of Structures" |
| 11/733,195 - Apr. 9, 2007 2008-0050524 - Feb. 28, 2008 | Kumar, "Methods of Forming Three-Dimensional Structures Having Reduced Stress and/or Curvature" |
| 11/506,586 - Aug. 8, 2006 2007-0039828 - Feb. 22, 2007 U.S. Pat. No. 7,611,616 - Nov. 3, 2009 | Cohen, "Mesoscale and Microscale Device Fabrication Methods Using Split Structures and Alignment Elements" |
| 10/949,744 - Sep. 24, 2004 2005-0126916 - Jun. 16, 2005 U.S. Pat. No. 7,498,714 - Mar. 3, 2009 | Lockard, "Three-Dimensional Structures Having Feature Sizes Smaller Than a Minimum Feature Size and Methods for Fabricating" |

Though various portions of this specification have been provided with headers, it is not intended that the headers be used to limit the application of teachings found in one portion of the specification from applying to other portions of the specification. For example, it should be understood that alternatives acknowledged in association with one embodiment, are intended to apply to all embodiments to the extent that the features of the different embodiments make such application functional and do not otherwise contradict or remove all benefits of the adopted embodiment. Various other embodiments of the present disclosure exist. Some of these embodiments may be based on a combination of the teachings herein with various teachings incorporated herein by reference.

In view of the teachings herein, many further embodiments, alternatives in design and uses of the embodiments of the instant disclosure will be apparent to those of skill in the art. As such, it is not intended that the invention be limited to the particular illustrative embodiments, alternatives, and uses described above but instead that it be solely limited by the claims presented hereafter.

What is claimed is:

1. A counterfeiting deterrent device comprising:
    a plurality of layers formed by an additive process, each of the plurality of layers having a bottom surface, an opposing top surface generally parallel to the bottom surface, and at least one outer edge in an additive thickness direction that connects a periphery of the top surface to a periphery of the bottom surface,
    wherein each of the plurality of layers has a thickness of less than 100 microns,
    wherein at least one of the plurality of layers has a series of indentations formed in the at least one outer edge of the layer such that the indentations can be observed to verify that the device originated from a predetermined source.

2. The device of claim 1, wherein each of the layers has a thickness of less than 30 microns.

3. The device of claim 1, wherein each of the indentations has a width of less than 50 microns.

4. The device of claim 1, wherein each of the indentations has a depth of less than 200 microns.

5. The device of claim 1, wherein the series of indentations traverses more than one of the plurality of layers.

6. The device of claim 1, wherein the series of indentations forms a non-repeating digital code having a length of at least three indentations which together represent a three digit binary number.

7. A counterfeiting deterrent device comprising:
a plurality of layers formed by an additive process,
wherein each of the layers has a thickness of less than 100 microns,
wherein at least one of the layers has a series of indentations formed in an outer edge of the layer such that the indentations can be observed to verify that the device originated from a predetermined source,
wherein the plurality of layers includes two adjacent layers each having a different series of indentations formed in its outer edge.

8. A counterfeiting deterrent device comprising:
a plurality of layers formed by an additive process,
wherein each of the layers has a thickness of less than 100 microns,
wherein at least one of the layers has a series of indentations formed in an outer edge of the layer such that the indentations can be observed to verify that the device originated from a predetermined source,
wherein the series of indentations traverses less than all of the plurality of layers, such that an overhang exists over the indentations.

9. A counterfeiting deterrent device comprising:
a plurality of layers formed by an additive process,
wherein each of the layers has a thickness of less than 100 microns,
wherein at least one of the layers has a series of indentations formed in an outer edge of the layer such that the indentations can be observed to verify that the device originated from a predetermined source,
further comprising a series of collinear exterior edge surfaces located between the indentations, and wherein each of the indentions has at least one recessed surface that is non-parallel to the collinear exterior edge surfaces.

10. A counterfeiting deterrent device comprising:
a plurality of layers formed by an additive process,
wherein each of the layers has a thickness of less than 100 microns,
wherein at least one of the layers has a series of indentations formed in an outer edge of the layer such that the indentations can be observed to verify that the device originated from a predetermined source,
wherein each of the layers is formed of a deposited material with each successive layer formed on and adhered to a previously formed layer, wherein each successive layer comprising at least two materials, one of which is a structural material and the other of which is a sacrificial material, and wherein the forming of each of the plurality of successive layers comprises:
  (i) depositing a first of the at least two materials;
  (ii) depositing a second of the at least two materials; and
  (iii) planarizing the deposited first and second materials,
  wherein after the plurality of successive layers has been formed, at least a portion of the sacrificial material is separated from the structural material to reveal a three-dimensional structure.

11. A method of deterring counterfeiting comprises the steps of:
providing a counterfeiting deterrent device formed by a multilayer additive process and comprising a plurality of layers each having a bottom surface, an opposing top surface generally parallel to the bottom surface, and at least one outer edge in an additive thickness direction that connects a periphery of the top surface to a periphery of the bottom surface, wherein each of the plurality of layers has a thickness of less than 100 microns, and wherein at least one of the plurality of layers has a series of indentations formed in the at least one outer edge of the layer such that the indentations can be observed to verify that the device originated from a predetermined source.

12. The method of claim 11, wherein the counterfeiting deterrent device is integrally formed on an article to be sold.

13. The method of claim 11, wherein the counterfeiting deterrent device is formed separately from an article to be sold, the method further comprising the step of attaching the device to the article to be sold.

14. The method of claim 11, further comprising the steps of directing a source of coherent light onto the series of indentations, and observing light that is reflected from the indentations with an electronic sensor.

15. The method of claim 11, wherein each of the layers is formed of a deposited material with each successive layer formed on and adhered to a previously formed layer, wherein each successive layer comprising at least two materials, one of which is a structural material and the other of which is a sacrificial material, and wherein the forming of each of the plurality of successive layers comprises:
  (i) depositing a first of the at least two materials;
  (ii) depositing a second of the at least two materials; and
  (iii) planarizing the deposited first and second materials,
  wherein after the plurality of successive layers has been formed, at least a portion of the sacrificial material is separated from the structural material to reveal a three-dimensional structure.

16. A counterfeiting deterrent device comprising:
at least one raised layer having outer edges in a shape of a logo;
at least one substrate layer having lateral dimensions that extend beyond the outer edges of the raised layer;
at least one intermediate layer disposed between the raised layer and the substrate layer and supporting the raised layer on the substrate layer, the intermediate layer having lateral dimensions that are recessed from the outer edges of the raised layer;
a slit formed in the substrate layer, the slit having outer edges that correspond with the outer edges of the raised layer; and
at least one light source located on an opposite side of the substrate layer from the intermediate and raised layers, the light source configured and arranged to shine a light through the slit in the substrate layer and past the intermediate layer to light up the outer edge of the raised layer, wherein the raised layer, substrate layer and intermediate layer are all formed by an additive process, and wherein each of the layers has a thickness of less than 100 microns.

17. The device of claim 16, wherein the outer edges of the slit are located laterally outward from the outer edges of the raised layer such that the light may travel through the slit and directly past the outer edges of the raised layer.

18. The device of claim 16, wherein the outer edges of the slit are located laterally inward from the outer edges of the raised layer such that the light must travel through the slit and scatter from a recessed surface of the raised layer and an outer surface of the substrate layer before passing the outer edges of the raised layer.

19. The device of claim 16, wherein each of the layers is formed of a deposited material with each successive layer formed on and adhered to a previously formed layer, wherein each successive layer comprising at least two materials, one of which is a structural material and the other of which is a sacrificial material, and wherein the forming of each of the plurality of successive layers comprises:
   (i) depositing a first of the at least two materials;
   (ii) depositing a second of the at least two materials; and
   (iii) planarizing the deposited first and second materials,
   wherein after the plurality of successive layers has been formed, at least a portion of the sacrificial material is separated from the structural material to reveal a three-dimensional structure.

20. The device of claim 16, wherein the device is formed separately from an article to be sold and configured to be attached to the article to be sold.

* * * * *